US010399642B2

(12) United States Patent
Szydlowski et al.

(10) Patent No.: US 10,399,642 B2
(45) Date of Patent: *Sep. 3, 2019

(54) METHOD AND SYSTEM FOR PROCESSING GLACIAL WATER

(71) Applicant: WORLD'S FRESH WATERS PTE, LTD, Singapore (SG)

(72) Inventors: Allen Szydlowski, Santiago (CL); Ian Szydlowski, Santiago (CL); Mickey Fouts, Castle Rock, CO (US)

(73) Assignee: World's Fresh Waters Pte. Ltd, Singapore (SG)

( * ) Notice: Subject to any disclaimer, the term of this patent is extended or adjusted under 35 U.S.C. 154(b) by 1290 days.

This patent is subject to a terminal disclaimer.

(21) Appl. No.: 14/578,915

(22) Filed: Dec. 22, 2014

(65) Prior Publication Data
US 2015/0125253 A1 May 7, 2015

Related U.S. Application Data

(63) Continuation of application No. 13/502,188, filed as application No. PCT/US2010/052864 on Oct. 15, 2010.
(Continued)

(51) Int. Cl.
*G06Q 30/00* (2012.01)
*B63B 25/08* (2006.01)
(Continued)

(52) U.S. Cl.
CPC ............. *B63B 25/08* (2013.01); *B63B 27/00* (2013.01); *B63B 35/285* (2013.01); *C02F 1/00* (2013.01);
(Continued)

(58) Field of Classification Search
CPC ....... G06Q 10/083; G06Q 10/08; G06Q 50/28
See application file for complete search history.

(56) References Cited

U.S. PATENT DOCUMENTS 2,371,404 A 3/1945 Mumford
2,391,926 A 1/1946 Scott
(Continued)

FOREIGN PATENT DOCUMENTS

CA 1049856 3/1979
CA 2744617 1/2013
(Continued)

OTHER PUBLICATIONS

International Search Report for International (PCT) Application No. PCT/US2010/052864, dated Dec. 28, 2010, 2 pages.
(Continued)

*Primary Examiner* — George Chen
(74) *Attorney, Agent, or Firm* — Sheridan Ross P.C.

(57) ABSTRACT

Methods and systems for recovering, processing, containing, and transporting water obtained from an ice source, i.e., a glacier, ice sheet, ice cap, etc., are described herein. The ice obtained from the ice source holds unique properties and is processed as a beverage for consumption having unique properties. Further, the resulting product is produced and transported with minimal human alteration and reduced energy input as compared to conventional methods for packaging water.

20 Claims, 17 Drawing Sheets

Related U.S. Application Data

(60) Provisional application No. 61/251,912, filed on Oct. 15, 2009, provisional application No. 61/303,519, filed on Feb. 11, 2010, provisional application No. 61/378,811, filed on Aug. 31, 2010.

(51) Int. Cl.

| | | |
|---|---|---|
| *C02F 1/00* | (2006.01) | |
| *E03B 3/30* | (2006.01) | |
| *B63B 35/28* | (2006.01) | |
| *B63B 27/00* | (2006.01) | |
| *B63B 1/04* | (2006.01) | |
| *B63B 21/50* | (2006.01) | |
| *B63B 43/12* | (2006.01) | |

(52) U.S. Cl.
CPC ............. *C02F 1/001* (2013.01); *C02F 1/005* (2013.01); *E03B 3/30* (2013.01); *B63B 1/048* (2013.01); *B63B 21/50* (2013.01); *B63B 2043/126* (2013.01); *C02F 2201/008* (2013.01); *C02F 2209/008* (2013.01); *Y02W 10/33* (2015.05); *Y02W 10/37* (2015.05); *Y10T 137/0318* (2015.04)

(56) References Cited

U.S. PATENT DOCUMENTS

| | | |
|---|---|---|
| 3,779,196 A | 12/1973 | Knaus et al. |
| 3,955,524 A | 5/1976 | Renoux |
| 3,967,396 A | 7/1976 | Maisonneuve et al. |
| 3,999,499 A | 12/1976 | Kitabayashi |
| 4,108,101 A | 8/1978 | Schirtzinger |
| 4,117,796 A | 10/1978 | Strain |
| 4,224,802 A | 9/1980 | Ooka |
| 4,227,478 A | 10/1980 | Preus |
| 4,233,085 A | 11/1980 | Roderick et al. |
| 4,331,129 A | 5/1982 | Hong et al. |
| 4,399,765 A | 8/1983 | Alkner et al. |
| 4,409,919 A | 10/1983 | Strain et al. |
| 4,432,669 A | 2/1984 | Cox et al. |
| 4,512,886 A | 4/1985 | Hicks et al. |
| 4,517,094 A | 5/1985 | Beall |
| 4,563,826 A | 1/1986 | Whitaker, Jr. |
| 4,564,450 A | 1/1986 | Piper et al. |
| 4,567,731 A | 2/1986 | Horan |
| 4,627,375 A | 12/1986 | Davis et al. |
| 4,713,898 A | 12/1987 | Bull et al. |
| 4,736,534 A | 4/1988 | Daniels et al. |
| 4,810,195 A | 3/1989 | Asmussen et al. |
| 4,890,958 A | 1/1990 | Dancer |
| 5,032,261 A | 7/1991 | Pyper |
| 5,099,779 A | 3/1992 | Kawaichi et al. |
| 5,131,341 A | 7/1992 | Newman |
| 5,197,912 A | 3/1993 | Lengefeld |
| 5,229,005 A | 7/1993 | Fok et al. |
| 5,413,065 A | 5/1995 | Spragg et al. |
| 5,487,485 A | 1/1996 | Yang et al. |
| 5,488,921 A | 2/1996 | Spragg |
| 5,505,585 A | 4/1996 | Hubbard |
| 5,562,824 A | 10/1996 | Magnusson et al. |
| 5,657,714 A | 8/1997 | Hsia et al. |
| 5,727,492 A | 3/1998 | Cuneo et al. |
| 5,910,248 A | 6/1999 | Tlok |
| 6,047,655 A | 4/2000 | Cran |
| 6,125,778 A | 10/2000 | Rodden |
| 6,139,809 A | 10/2000 | Rodden |
| 6,194,790 B1 | 2/2001 | Griffin et al. |
| 6,293,217 B1 | 9/2001 | Savage et al. |
| 6,330,865 B1 | 12/2001 | Cran |
| 6,550,410 B2 | 4/2003 | Reimers |
| 6,580,025 B2 | 6/2003 | Guy |
| 6,615,759 B2 | 9/2003 | Yaffe |
| 6,675,734 B2 | 1/2004 | Eagles et al. |
| 6,718,896 B2 | 4/2004 | Davenport |
| 6,739,274 B2 | 5/2004 | Eagles et al. |
| 6,802,684 B2 | 10/2004 | Arntzen et al. |
| 6,808,808 B2 | 10/2004 | Freeman et al. |
| 6,832,571 B2 | 12/2004 | Eagles |
| 6,860,218 B2 | 3/2005 | Eagles et al. |
| 6,869,540 B2 | 3/2005 | Robinson |
| 6,902,368 B2 | 6/2005 | Hagenzieker et al. |
| 6,923,135 B2 | 8/2005 | Kranebitter |
| 6,928,336 B2 | 8/2005 | Peshkin et al. |
| 6,997,643 B2 | 2/2006 | Wille et al. |
| 7,002,472 B2 | 2/2006 | Stratmoen et al. |
| 7,024,748 B2 | 4/2006 | Eagles |
| 7,062,406 B2 | 6/2006 | Patwardhan et al. |
| 7,077,963 B2 | 7/2006 | McConchie |
| 7,107,921 B2 | 9/2006 | Davis et al. |
| 7,117,807 B2 | 10/2006 | Bohn, Jr. et al. |
| 7,143,709 B2 | 12/2006 | Brennan et al. |
| 7,201,291 B2 | 4/2007 | Vingy et al. |
| 7,201,624 B2 | 4/2007 | Dyhrberg |
| 7,273,562 B2 | 9/2007 | Robinson |
| 7,287,481 B1 | 10/2007 | Wrage et al. |
| 7,308,862 B2 | 12/2007 | Romanski et al. |
| 7,320,289 B1 | 1/2008 | Clarke et al. |
| 7,332,082 B2 | 2/2008 | Brandlmaier |
| 7,347,970 B2 | 3/2008 | Kim et al. |
| 7,365,266 B2 | 4/2008 | Heckeroth |
| 7,390,343 B2 | 6/2008 | Tepper et al. |
| 7,402,253 B2 | 7/2008 | van Leeuwen et al. |
| 7,407,592 B2 | 8/2008 | van Leeuwen et al. |
| 7,410,339 B2 | 8/2008 | Franzen et al. |
| 7,410,573 B2 | 8/2008 | Saho et al. |
| 7,416,660 B2 | 8/2008 | van Leeuwen et al. |
| 7,451,604 B2 | 11/2008 | Yoshida et al. |
| 7,500,442 B1 | 3/2009 | Schanz |
| 7,504,741 B2 | 3/2009 | Wrage et al. |
| 7,546,813 B2 | 6/2009 | Wrage |
| 7,553,418 B2 | 6/2009 | Khudenko et al. |
| 7,564,989 B2 | 7/2009 | Schanz |
| 7,569,148 B2 | 8/2009 | Elefritz et al. |
| 7,588,686 B2 | 9/2009 | Jensen |
| 7,650,848 B2 | 1/2010 | Brennan et al. |
| 7,672,761 B2 | 3/2010 | Wrage et al. |
| 7,686,539 B2 | 3/2010 | Aristaghes et al. |
| 7,690,319 B2 | 4/2010 | Wingate |
| 7,731,847 B2 | 6/2010 | Huy |
| 7,740,765 B2 | 6/2010 | Mitchell et al. |
| 7,755,211 B2 | 7/2010 | Montgomery |
| 7,775,171 B2 | 8/2010 | Tupil |
| 7,798,083 B2 | 9/2010 | Wrage |
| 7,841,289 B1 | 11/2010 | Schanz |
| 7,866,271 B2 | 1/2011 | Wrage et al. |
| 7,900,780 B2 | 3/2011 | Ueki et al. |
| 7,932,461 B2 | 4/2011 | Johnson et al. |
| 7,971,545 B2 | 7/2011 | Wrage |
| 7,987,017 B2 | 7/2011 | Buzzoni et al. |
| 8,007,845 B2 | 8/2011 | Szydlowski |
| 8,056,490 B2 | 11/2011 | Wrage |
| 8,058,985 B2 | 11/2011 | Dobson et al. |
| 8,117,977 B2 | 2/2012 | Reusch |
| 8,215,588 B2 | 7/2012 | Wrage et al. |
| 8,282,972 B2 | 10/2012 | Szydlowski |
| 8,306,649 B2 | 11/2012 | Buzzoni et al. |
| 8,322,294 B2 | 12/2012 | Bowhay |
| 8,403,718 B2 | 3/2013 | Szydlowsk et al. |
| 8,488,246 B2 | 7/2013 | Border et al. |
| 8,492,023 B2 | 7/2013 | Sastry et al. |
| 8,496,423 B2 | 7/2013 | Springett et al. |
| 8,506,739 B2 | 8/2013 | Gautier et al. |
| 8,508,065 B1 | 8/2013 | Lee |
| 8,522,707 B1 | 9/2013 | Shiban |
| 8,527,457 B2 | 9/2013 | Moon et al. |
| 8,529,376 B2 | 9/2013 | Morgan et al. |
| 8,702,460 B2 | 4/2014 | Szydlowski et al. |
| 8,715,756 B2 | 5/2014 | Szydlowski |
| 8,924,311 B2 | 12/2014 | Szydlowski et al. |
| 9,950,773 B2 | 4/2018 | Szxydlowski et al. |
| 2002/0148401 A1 | 10/2002 | Eagles et al. |
| 2002/0188459 A1 | 12/2002 | Erickson |
| 2004/0038089 A1 | 2/2004 | Hoffjann et al. |

(56) References Cited

U.S. PATENT DOCUMENTS

| | | |
|---|---|---|
| 2004/0144294 A1 | 6/2004 | Yaffe |
| 2004/0215367 A1 | 10/2004 | King et al. |
| 2005/0066868 A1 | 3/2005 | Saho et al. |
| 2005/0276666 A1 | 12/2005 | Wille et al. |
| 2005/0284361 A1 | 12/2005 | Muis et al. |
| 2006/0027507 A1 | 2/2006 | van Leeuwen |
| 2006/0096990 A1 | 5/2006 | Reed |
| 2006/0293770 A1 | 12/2006 | Masunaga |
| 2007/0073609 A1 | 3/2007 | Odom et al. |
| 2007/0246424 A1 | 10/2007 | Hironari |
| 2008/0017591 A1 | 1/2008 | Ranade et al. |
| 2008/0110091 A1 | 5/2008 | Perkins et al. |
| 2008/0116142 A1 | 5/2008 | Fischmann Torres |
| 2008/0127654 A1 | 6/2008 | Darling et al. |
| 2008/0174485 A1 | 7/2008 | Carani et al. |
| 2008/0194160 A1 | 8/2008 | Concannon |
| 2008/0196581 A1 | 8/2008 | Cooley |
| 2008/0200746 A1 | 8/2008 | Bird et al. |
| 2008/0203093 A1 | 8/2008 | Skulnick |
| 2008/0235858 A1 | 10/2008 | Schanz |
| 2008/0251755 A1 | 10/2008 | Matula et al. |
| 2009/0055294 A1 | 2/2009 | Shirazi |
| 2009/0126400 A1 | 5/2009 | Pozivil |
| 2009/0146815 A1 | 6/2009 | Cho |
| 2009/0221983 A1 | 9/2009 | Schanz |
| 2009/0276105 A1 | 11/2009 | Lacaze et al. |
| 2009/0308412 A1 | 12/2009 | Dixon |
| 2009/0314725 A1 | 12/2009 | Parro |
| 2010/0000252 A1 | 1/2010 | Morris et al. |
| 2010/0015325 A1 | 1/2010 | Muis et al. |
| 2010/0042527 A1 | 2/2010 | Mitchell et al. |
| 2010/0063902 A1 | 3/2010 | Constantz et al. |
| 2010/0116647 A1 | 5/2010 | Kornmuller |
| 2010/0116684 A1* | 5/2010 | Sawyer ............ F03D 9/00 205/628 |
| 2010/0119755 A1 | 5/2010 | Chung et al. |
| 2010/0126404 A1 | 5/2010 | Brennan et al. |
| 2010/0226943 A1 | 9/2010 | Brennan et al. |
| 2010/0272630 A1 | 10/2010 | Rosenbaum |
| 2010/0280750 A1 | 11/2010 | Chen et al. |
| 2010/0287073 A1 | 11/2010 | Kocis |
| 2010/0319923 A1 | 12/2010 | Slabaugh |
| 2011/0036919 A1 | 2/2011 | Baird |
| 2011/0089123 A1 | 4/2011 | Kennedy |
| 2011/0091607 A1 | 4/2011 | Szydlowski |
| 2011/0132849 A1 | 6/2011 | Husain |
| 2011/0147293 A1 | 6/2011 | Imahashi |
| 2011/0303277 A1 | 12/2011 | Neumann et al. |
| 2011/0311769 A1 | 12/2011 | Chen et al. |
| 2012/0024215 A1 | 2/2012 | Flockenhagen |
| 2012/0216875 A1 | 8/2012 | Szydlowski et al. |
| 2012/0223583 A1 | 9/2012 | Cooley et al. |
| 2012/0248878 A1 | 10/2012 | Iwanaga et al. |
| 2012/0312364 A1 | 12/2012 | Uhrich et al. |
| 2013/0000342 A1 | 1/2013 | Blasko et al. |
| 2013/0026978 A1 | 1/2013 | Cooley et al. |
| 2013/0160692 A1 | 6/2013 | Skiadas |
| 2013/0175382 A1 | 7/2013 | Brutoco |
| 2013/0175404 A1 | 7/2013 | Shefer |
| 2013/0197717 A1 | 8/2013 | Fraser et al. |
| 2013/0202435 A1 | 8/2013 | Beaudoin |
| 2013/0210461 A1 | 8/2013 | Moldavsky et al. |
| 2013/0213897 A1 | 8/2013 | Jauncey et al. |
| 2013/0217822 A1 | 8/2013 | Hofmann et al. |
| 2013/0220205 A1 | 8/2013 | Henriksen |
| 2013/0221158 A1 | 8/2013 | Binkholder et al. |
| 2013/0228645 A1 | 9/2013 | Van Speybroeck et al. |
| 2013/0230396 A1 | 9/2013 | Wakasa et al. |
| 2013/0230747 A1 | 9/2013 | Patolsky et al. |
| 2014/0014188 A1 | 1/2014 | Szydlowski et al. |
| 2014/0033963 A1 | 2/2014 | Szydlowski et al. |
| 2014/0059979 A1 | 3/2014 | Szydlowski et al. |
| 2014/0237951 A1 | 8/2014 | Szydlowski et al. |
| 2015/0217837 A1 | 8/2015 | Szydlowski et al. |

FOREIGN PATENT DOCUMENTS

| | | |
|---|---|---|
| CN | 1079881 | 12/1993 |
| EP | 0203477 | 12/1986 |
| EP | 0538563 | 4/1993 |
| EP | 0832826 | 4/1998 |
| EP | 1006084 | 6/2000 |
| EP | 0855012 | 8/2003 |
| EP | 1447384 | 8/2004 |
| EP | 1637819 | 3/2006 |
| EP | 1723021 | 11/2006 |
| EP | 2499212 | 9/2012 |
| GB | 821195 | 9/1959 |
| JP | 2003/081177 | 3/2003 |
| WO | WO 99/28182 | 6/1999 |
| WO | WO 99/65797 | 12/1999 |
| WO | WO 00/39408 | 7/2000 |
| WO | WO 02/44089 | 6/2002 |
| WO | WO 02/074692 | 9/2002 |
| WO | WO 03/104089 | 12/2003 |
| WO | WO 2008/110762 | 9/2008 |
| WO | WO 2010/063135 | 6/2010 |
| WO | WO 2011/066193 | 6/2011 |
| WO | WO 2011/071892 | 6/2011 |
| WO | WO 2011/124222 | 10/2011 |
| WO | WO 2012/020259 | 2/2012 |
| WO | WO 2013/016440 | 1/2013 |
| WO | WO 2013/040521 | 3/2013 |

OTHER PUBLICATIONS

Written Opinion for International (PCT) Application No. PCT/US2010/052864, dated Dec. 28, 2010, 5 pages.

International Preliminary Report on Patentability for International (PCT) Application No. PCT/US2010/052864, dated Apr. 26, 2012, 10 pages.

Final Action for U.S. Appl. No. 13/502,188 dated Jul. 8, 2014, 13 pages.

Notice of Allowance for U.S. Appl. No. 13/502,188 dated Aug. 21, 2014, 6 pages.

U.S. Appl. No. 15/959,438, dated Apr. 23, 2018, Szydlowski et al.

U.S. Appl. No. 14/444,806, filed Jul. 28, 2014, Szydlowski et al.

"Alaska Glacier Cap Bottled Water," Fine Waters, Aug. 2004, found at www.web.archive.org/web/20040809211105/www.finewaters.com/Bottled_Water/USA/Alaska_Glacier_Cap.asp, printed Sep. 30, 2010, 2 pages.

"Aqua Pacific: Fiji's Finest Mineral Water," Crystal Clear Mineral Water & Aqua Pacific, Jun. 11, 2009, [retrieved on Mar. 20, 2014], 5 pages. Retrieved from: http://web.archive.org/web/20090611120827/http://www.aquapacific.com/underground.html.

"Argonne Lab Experiment Simulates Comet Collision, The University of Chicago," Chronicle, Apr. 26, 2001, vol. 20, No. 15, 2 pages.

"Bottled Water and Energy A Fact Sheet," © 2008 Pacific Institute, www.pacinst.org/topics/water_and_sustainability/bottled_water/bottled_water_and_energy.html, printed Sep. 9, 2009, 2 pages.

"CargoWiz Truck, Container and Pallet Loading Software," Softtruck, 2007, [retrieved on Dec. 24, 2013], 3 pages. Retrieved from: www.softtruck.com/index.htm.

"Comet discovered at a crucial ingredient for life," LATERCERA.CL, Aug. 18, 2009, (Mechanical Translation), 2 pages.

"ContainerPacTM Disposable and Reusable Flexitanks," Flexitank, 2008, [retrieved on Apr. 25, 2013], 3 pages. Retrieved from: flexitank.com.au/subproducts/containerpac.html.

"Global Ballast Water Management Programme—The New Convention," GloBallast, 2006, 3 pages (found at www.globallast.imo.org/index.asp?p.=mepc.htm).

"Report 4 of 5: Water Cigars—Greece," Hands on—the Earth Report from TVE.org, Series 2: Programme 10 of 14—WaterWays, 4 pages, 2004, www.tve.org/ho/series2/waterways_reports/watercigars_greece.html.

"Soil and Aquifer Properties and Their Effect on Groundwater," found at www.co.portage.wi.us/groundwater/undrstnd/soil.htm, printed Sep. 21, 2009, 8 pages.

(56) References Cited

OTHER PUBLICATIONS

"Solar-powered plane completes cross-country flight," Fox News. com, Jul. 7, 2013 [retrieved on Jul. 8, 2013], 2 pages. Retrieved from: www.foxnews.com/us/2013/07/07/solar-powered-plane-completes-cross-country-flight/?test=latestnews.
"Solar powered plane completes history-making cross-country flight, lands at JFK airport," The Washington Post, Jul. 6, 2013, [retrieved on Jul. 8, 2013], 4 pages. Retrieved from: www.washingtonpost.com/politics/solar-powered-plane-has-tear-on-wing-earlier-landing-expected-in-nyc-on-final-leg-of-flight/2013/07/06/98e50c56-e69a-11e2-97c2-eee7eab7397e_story.html.
"Terroir" Wikipedia, found at www.en.wikipedia.org/wiki/Terroir, printed Sep. 21, 2009, 6 pages.
"The Fiji Aquifer—450 Year Old Water," FineWaters, Nov. 2003, found at www.web.archive.org/web/20031102060856/finewaters.com/Resources/Water_Science/The_Fiji_Aquifer.asp, 1 page.
"The Problem," GloBallast, retrieved Jan. 8, 2013, 5 pages (found at: www.globallast.imo.org/index.asp?page=problem.htm).
"Water Transport Technology," MH Waters Pty Ltd., 2005, downloaded from www.mywaters.com/watertransport.html, 1 page.
"What if Greenland was Africa's water fountain?" Pruned, Oct. 2, 2006, www.pruned.blogspot.com/2006/10/what-if-greenland-was-africas-water.html, 5 pages.
"World's Most Expensive Bottled Water," Alvinology, Apr. 15, 2008, 12 pages (www.alvinology.com/2008/04/15/worlds-most-expensive-bottled-water/).
10 Thousand BC—Luxury Glacier Water, found at www.10thousandbc.com, printed Sep. 30, 2010, 3 pages.
10 Thousand BC trademark, [on line]], [retrieved on Sep. 30, 2010]. Retrieved from the Internet: URL:www.tess2.uspto.gov/bin/showfield?f=doc&state=4008:gktt2k.2.1 , 2 pages.
Alfredo, "Carbon Dating Bottled Water," Fine Waters Vintage, Jul. 4, 2004 found at www.finewaters.com/Bottled_Water_Etiquette/Flavor_of_Water/FineWaters_Vintage/Print.asp, 1 page.
Christner et al., "Recovery and Identification of Viable Bacteria Immured in Glacial Ice," Icarus vol. 144, Iss. 2, Apr. 2000, (Abstract) 3 pages.
Doyle "Sea-Going Water Bags to Quench World Thirst?" Reuters, Nov. 27, 2011, 4 pages.
Epica community members, "Eight glacial cycles from an Antarctic ice core," Nature, 2004, vol. 429, pp. 623-628.
Felton, "A Fashion Trend Meets a Watery Grave," The Wall Street Journal, Aug. 6, 2009, 2 pages.
Fickling, "Australian Bladders Become New Normal for Wine Exports," Bloomberg.com, Jan. 30, 2013 [retrieved on Apr. 25, 2013], 4 pages. Retrieved from: www.bloomberg.com/news/2013-01-30/australian-bladders-become-new-normal-for-wine-exports.html.

Gardiner, "How to Load a Giant Container Ship," Wired.com, Aug. 1, 2013, [retrieved on Dec. 26, 2013], 6 pages. Retrieved from: www.wired.com/business/2013/08/qq_containership/.
Ghose, "A Year of Global Shipping Routes Mapped by GPS," Wired Science, Jan. 25, 2010, [retrieved on Jul. 25, 2013], 2 pages. Retrieved from: www.wired.com/wiredscience/2010/01/global-shipping-map/.
Glavin et al. "Re-examination of amino acids in Antarctic micrometeorites," Advances in Space Research, 2004, vol. 33, No. 1, pp. 106-113.
Haeberli, "Absolute and Relative Age Dating of Rock Glacier Surfaces in Alpine Permafrost," European Geological Society, Geophysical Research Abstracts, Apr. 2003, vol. 5, Issue 10890, 2 pages.
Hajim, "Iceberg Hunters," Fortune, Nov. 14, 2005, 1 page.
Mascha, "The Age of Water—How Old is Your Water?" Fine Waters, Mar. 2, 2005, found at www.finewaters.com/Bottled_Water_Etiquette/Bottled_Water_History/The_Age_ofWater_How_Old_is_Your_Water/All_Pages.asp, 2 pages.
Mission 2012:Clean Water, "Contingency Plans," archived on Aug. 21, 2009, available online at http://web.archive.org/web/20090821170721/http://web.mit.edu/12.000/www/m2012/finalwebsite/solution/contingency.shtml, 8 pages.
Old Water—10 Thousand BC Luxury Glacier Water, Trendhunter, found at www.trendhunter.com/trends/old-water-10-thousand-bc-luxury-g lacier-water, printed Sep. 30, 2010, 2 pages.
Scott, "Running Dry," Chemical and Engineering News, Jul. 22, 2013, pp. 11-15.
Thompson, "The Energy Footprint of Bottled Water," Live Science, Mar. 18, 2009, 1 page.
Zhou et al. "Evaluating the costs of desalination and water transport," Dec. 2004, www.uni-hamburg.de/Wiss/FB/15/Sustainability/DesalinationFNU41_revised.pdf, 16 pages.
Official Action for U.S. Appl. No. 11/551,125, dated Jul. 20, 2010 Restriction Requirement, 9 pages.
Official Action for U.S. Appl. No. 11/551,125, dated Oct. 7, 2010, 8 pages.
Notice of Allowance for U.S. Appl. No. 11/551,125, dated Apr. 25, 2011, 9 pages.
Official Action for U.S. Appl. No. 12/905,590, dated Nov. 28, 2012 15 pages.
Official Action for U.S. Appl. No. 12/905,590, dated Jul. 11, 2013 27 pages.
Official Action for U.S. Appl. No. 13/502,188 dated Jan. 21, 2014, 7 pages.
Official Action for U.S. Appl. No. 13/502,188 dated Apr. 18, 2014, 12 pages.

* cited by examiner

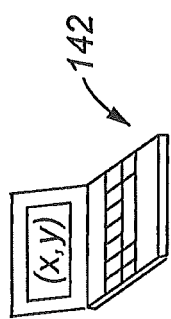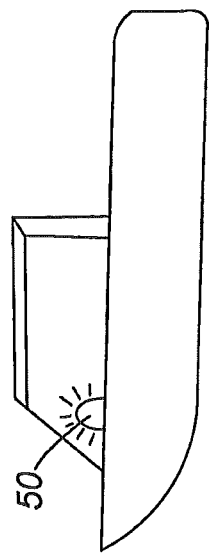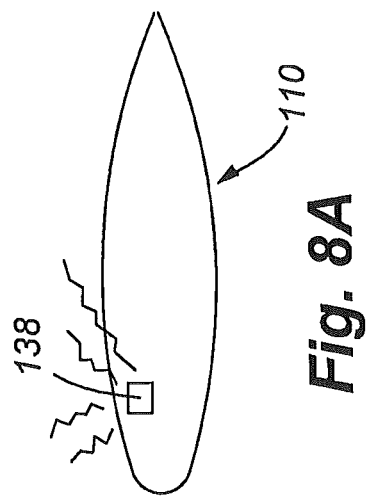
Fig. 8A
Fig. 8B
Fig. 8C

METHOD AND SYSTEM FOR PROCESSING GLACIAL WATER

RELATED APPLICATIONS

This application is a continuation of U.S. patent application Ser. No. 13/502,188, filed on Jul. 27, 2012, which is a national stage application under 35 U.S.C. 371 of PCT Application No. PCT/US2010/052864 having an international filing date of 15 Oct. 2010, which designated the United States, which PCT application claimed the benefit of U.S. Provisional Application No. 61/251,912 filed 15 Oct. 2009; U.S. Provisional Application No. 61/303,519 filed 11 Feb. 2010; and U.S. Provisional Application No. 61/378,811 filed 31 Aug. 2010, the entire disclosure of each of which is incorporated herein by reference.

FIELD OF THE INVENTION

The present invention relates generally to a method and system for obtaining, preparing, transporting, and/or trading water. More specifically, it relates to the procurement of glacial ice and glacial melt-waters, to provide clean, valuable, and potable water.

BACKGROUND OF THE INVENTION

Water is the most abundant compound in the human body, making up from 50% to 80% of the human body. Thus, water is essential for life. Without water, a person will die of dehydration within a few days. Thus, clean drinking water is a valuable commodity. Moreover, as the world's population has grown from about 2.5 billion in the early $20^{th}$ century to around 7 billion today (U.S. Census Bureau, International Database, http://www.census.gov/ipc/www/idb/worldpopinfo.php), sources of clean drinking water have become even more valuable. As the world's population continues to grow, the need for water will only increase. Thus, water has been called the new oil, a resource long squandered, increasingly in demand and hence more expensive, and soon to be overwhelmed by unquenchable demand.

While a little more than 70% of the Earth's surface is covered by water, much of it is undrinkable (The Hydrologic Cycle, United States Geological Survey Pamphlet, U.S. Department of the Interior, 1984). In fact, 97% of all water on the planet is found in the oceans and has a salt content of greater than 30,000 milligrams per liter (mg/L) (Gleick, P. H. (2000), *The World's Water* 2000-2001, *the biennial report on freshwater resources*, Island Press, Washington, D.C., USA.). Techniques, such as reverse-osmosis, do exist for removing salt and other minerals from sea water (desalination) rendering it drinkable. However, such techniques are complicated, producing large volumes of waste water per volume of drinkable water, and in addition, are energy-intensive and expensive. Indeed, one study concluded that you would need to lift water by 2000 m, or transport it over more than 1600 km (approximately 1000 miles) to get transport costs equal to the desalination costs (Zhou, Y., Tol, R. S. J., Evaluating the costs of desalination and water, (Working paper), December, 2004, via http://www.uni-hamburg.de/Wiss/FB/15/Sustainability/DesalinationFNU41_revised.pdf.) Thus for much of the world, the seas are not a viable option for obtaining water.

Of the about 3% of water that is not salty, about 2% is frozen at the poles or in glaciers, leaving about 1% of the water on the Earth available for use (Gleick, P. H., 1996: Water resources. In Encyclopedia of Climate and Weather, ed. by S. H. Schneider, Oxford University Press, New York, vol. 2, pp. 817-823). This water is divided amongst underground aquifers, lakes, rivers, reservoirs and or course, rain. While these are useful sources of water, overuse and political aims have led to aquifers falling, reservoirs drying up and rivers no longer flowing to the sea. In fact, some have predicted that wars will soon be fought over access to water, just as wars over oil played a major role in $20^{th}$ century history (Solomon, Steven, Water: The Epic Struggle for Wealth, Power and Civilization, New York, HarperCollins Publishers, 2010). Moreover, climate change threatens to make these problems worse.

In addition to the increasing need for sources of fresh drinking water, with increasing interest in healthier lifestyles has come increasing consumer demand for pure drinking water. This is evidenced by the growth in the bottled water business. Thirty years ago, the bottled water industry barely existed. In 2007, Americans spent approximately $16 billion on bottled water (Fast Company, Issue 117, July, 2007), and industry sales are growing at about 8% annually (King, Mike, Bottled Water—Global Industry Guide—New Research Report on Companies and Markets, July, 2008, via http://www.pr-inside.com/bottled-water-global-industry-guide-r688919.htm). Additionally, over the last decade, specialty waters, such as vitamin water, were one of the fastest growing health tends. Clearly then, consumers are willing to pay for water having unique, desirable characteristics.

As previously noted, approximately 70% of the planets fresh water is frozen in ice caps or glaciers. Thus these ice caps and glaciers represent a potential source of fresh water. Furthermore, because of the process by which ice caps and glaciers form, and because of their age, water stored in ice caps and glaciers was frozen in place so long ago that it has unique properties not present in surface water. Inland ice and glaciers are formed by yearly snowfall. Snowfall accumulates and compresses in ice shelves over the course of many years to depths reaching over 4,000 meters in some areas. As the ice layers are compressed, and in the course of thousands of years, the ice moves towards ice rims and glaciers or other terminal points of the ice shelves. Glacial ice advances then retreats from year to year depending upon the climate around the glacier and typical snow accumulation. Glacier movements and shape shifting occur over very long periods of time (i.e., hundreds to thousands of years), but within historic memory, such transformations in fewer than 100 years are not known. Thus, these frozen bodies of water have existed, as mentioned above, for thousands upon thousands of years. In the case of the Antarctic ice sheet, it has an age of over 40 million years.

The use of inland ice as a source of a drinking water resource has been appreciated for years and, in fact, there are several companies that sell water as originating from glaciers. However, known methods have been disadvantageous, because some of the natural purity of the ice has been lost in the preparation of the ice as drinking water, after ice has been taken out from its natural occurrence, such as an iceberg. It has been necessary to melt the ice and then bottle or pack the water in containers permitting transport and distribution of the water to consumers.

In addition to being sources of fresh water, ice caps and glaciers have heretofore unappreciated characteristics. Because such ice was formed far away in time and geography from modern day pollutants, it is extremely pure with regard to such pollutants. Additionally, because methods exist for obtaining and dating ice from various depths, it is possible to obtain water from a specific time period. Consumers may readily appreciate being able to obtain water in the form it existed at the time of Shakespeare, King Arthur, or Jesus, for example.

Other unappreciated advantages can be obtained as well. For example, in recent years, groundbreaking research has yielded evidence of the existence of extraterrestrial components within terrestrial ice, theorized to have been deposited by amino acid-bearing comets that collided with Earth approximately four billion years ago. In 2004, a collection of high speed dust samples taken from the comet Wild-2 by the NASA Stardust probe revealed the existence of glycine, a basic component of proteins, within the comet. The existence of these components in the Wild-2 comet provides much of the basis for the theory that the building blocks for life on Earth were delivered by meteorite and comet impacts. These components have also been found on Earth, preserved in glacial ice in a similar manner as to how they are preserved in frozen comets. It is known that amino acids are crucial elements of life as they form the basis of proteins, which are linear chains of amino acids. Accordingly, credible evidence exists to state a theory that the early origins of life on Earth are present in current polar and non-polar ice sheets.

While the use of inland ice as a source of water has been proposed, current systems for obtaining and distributing water fail to provide such water in its purest form. Moreover, current distribution systems are not on-demand. That is, the water is first bottled at a source, usually a bottling plant, after which it is shipped to warehouses and then on to the point of final sale. Thus, volumes of water are shipped based on estimates of sales with the result that too much, or too little, water might be shipped. Thus water may sit for long periods of time prior to consumption, leading to leaching of container components and off tastes. Moreover, all of the water supplied at the bottling plant is the same, meaning that the customer has no ability to obtain water having a desired, special characteristic. Thus, currently there are no methods of obtaining and distributing inland ice water in its pure form. Moreover, no method currently exists for economically obtaining distributing inland ice water in an on-demand fashion, based on need and desirability of specific characteristics. The present invention solves these heretofore unmet needs.

Currently, many methods exist for the purification and desalination of water in order to produce potable and commercially appealing drinking products, such as reverse-osmosis. Many of these processes suffer from the drawbacks of high production costs, resulting carbon emissions from the facilities in which they take place, and a significant level of waste water per volume of resulting potable water. As the demand for clean water increases, these methods have also been criticized for the strain they put on natural aquifers. In coastal regions with groundwater aquifers underlain by saline layers, concerns of saltwater encroachment exist where the over-burdening of freshwater aquifers creates a pressure differential that allows heavy concentrations of salt water to infiltrate the drinking supply.

Purification and desalination of water to remove undesired contents such as harmful bacteria and heavy metals, typically is an energy-intensive process. In addition to the raw energy consumption required to produce clean water, it is estimated that at least twice the amount water is used in the production process than is actually bottled. In other words, one liter of bottled water represents three liters of water consumed. It has also been estimated that tens of millions of barrels of oil were required to generate the energy needed to produce the volume of bottled water consumed in the United States in 2007.

In addition to the numerous environmental concerns surrounding the current methods of procuring potable water, various health concerns are present as well. Concerns over undesirable foreign contents in municipal water supplies have forced many consumers to balance the aforementioned environmental risks with the perhaps more personal and immediate concerns posed by these health risks. Contaminants such as heavy metals, including transition metals, metalloids, lanthanoids, and actinides (e.g. Mercury, Lead, Chromium, etc.), PCBs (polychlorinated biphenyls), and pesticides frequently occur in water supplies of even advanced regions. The primary causes of these contamination concerns, aging water distribution infrastructure and pollution, are significant public works concerns that will require significant time and cost to update and repair.

Many water sources are tainted as a result of their latitudes and relative proximity to industrialized nation's carbon emissions, e.g. mercury from coal and petroleum fired power plants. Accordingly, in a preferred embodiment of the present invention, the selected water source is located in a region that is generally unaffected by pollution from industrialized nations. Glacial ice situated in regions between 15 and 60 degrees south latitude, such as Chilean glaciers, provides desirable sources of ice and water for use in the present invention. Additionally, many natural sources of water contain harmful microorganisms, such as Guardia, which often require energy intensive methods such as boiling or the addition of otherwise undesirable substances such as chlorine to eliminate. These concerns are prevalent even in relatively unpolluted areas as such microorganisms frequently enter the water supply from a wide range of their mammalian hosts. Giardia in particular, which is estimated to infect over 2.5 million people annually, typically results in severe gastrointestinal symptoms causing weight loss, malaise, and fatigue.

In recent years, groundbreaking research has yielded evidence of the existence of microorganisms within terrestrial ice. These microorganisms are theorized to have originated with amino acid-bearing comets that collided with Earth approximately four billion years ago and may have assembled into early proteins and DNA. In 2004, a collection of high speed dust samples taken from the comet Wild-2 by the NASA Stardust probe revealed the existence of glycine, a basic component of proteins, within the comet. The existence of these components in the Wild-2 comet provides much of the basis for the theory that the building blocks for life on Earth were delivered by meteorite and comet impacts. These components have also been found on Earth, preserved in glacial ice in a similar manner as to how they are preserved in frozen comets. It is known that amino acids are crucial elements of life as they form the basis of proteins, which are linear chains of amino acids. Accordingly, credible evidence exists to state a theory that the early origins of life on Earth are present in current polar and non-polar ice sheets.

While the details of the potential health benefits of these amino acids have yet to be evaluated, there exists a viable market for unadulterated drinking water which could reasonably be calculated to contain glycine and primordial building blocks of life. In addition to the commercially appealing aspects of consuming the origins of life itself, glycine is known to produce a sweet taste for humans.

As the world's population continues to increase, so does the demand for fresh water that is safe for consumption and the like. Despite many advances in water purification technology, many areas of the world are currently affected and will continue to be affected by a lack of this fundamental natural resource. Currently, many methods, such as reverse-osmosis, exist for the purification and desalination of water in order to produce potable and commercially appealing drinking products. Many of these processes suffer from the drawbacks of high production costs, resulting carbon emissions from the facilities in which they take place, and a significant level of waste water per volume of resulting potable water. As the demand for clean water increases, some methods have also been criticized for the strain they put on natural aquifers. In coastal regions with groundwater aquifers underlain by saline layers, concerns of saltwater encroachment exist where the over-burdening of freshwater aquifers creates a pressure differential that allows heavy concentrations of salt water to infiltrate the drinking supply.

Indeed, many areas in need of a reliable water supply do not have the availability of the resource itself to even reap the benefits of purification technologies. At the same time, however, a few specific regions of the Earth have abundant supplies of fresh, clean, and safe water which offer the potential to alleviate demands for water by utilizing the appropriate means for conveyance.

Devices and methods for transporting large volumes of water to distant regions of the Earth have proved costly and inefficient. For example, filtration, purification, and bottling of water for transportation and consumption have become a subject of scrutiny in recent years. In addition to the raw energy consumption required to produce clean water, it is estimated that at least twice the amount water is used in the production process than is actually bottled. In other words, one liter of bottled water may represent as much as three liters of water consumed. It has also been estimated that tens of millions of barrels of oil were required to generate the energy needed to produce the volume of bottled water consumed in the United States in 2007. Furthermore, the production and transportation costs of these methods are proving to be more and more taxing upon our planet's already strained natural resources.

Recent research has also revealed that one common method for transporting water and drinking liquids, containment via plastic bottles, poses a variety of health and environmental risks. It is estimated that approximately 70 million plastic bottles of water are consumed daily in the United States alone. In addition to the obvious strain that this puts on landfills and natural resources, many of these bottles may also contain Bisphenol ("BPA") which may pose health risks to humans. Even bottles that do not contain BPA pose the risk of leaching other chemicals into the contained water or fluid. While bottled water is not without its benefits, it is often desirable to reduce the amount of bottles used or the duration which water or liquid is stored in the bottles.

Accordingly, a long felt but unsolved need exists for a method and system that can be economically employed to contain and convey pure and safe drinking water from various regions of the Earth to those having a need or demand for the same. Additionally, a long felt but unsolved need exists for a method and system that can be economically employed to procure waters having some of the above reference positive attributes without including undesired components. A long felt and unmet need further exists with respect to systems and methods for economically conveying, transporting, trading and/or selling rights and title to the world's fresh waters.

SUMMARY OF THE INVENTION

These and other needs are addressed by the various embodiments and configurations of the present invention.

Applicant hereby incorporates by reference in its entirety U.S. patent application Ser. No. 11/551,125 to Szydlowski, filed on Oct. 19, 2006.

It is an object of the present invention to obtain water from naturally occurring sources, where it is naturally filtered by its desirable geographic and topographic surroundings, and ensure purification of the water without pasteurizing, filtering, sanitizing, or otherwise eliminating certain commercially viable contents. In one particular embodiment, glacial water is procured and directed through a conduit system that comprises one or more sections having native Chilean earth components thereto.

It is a further object of the present invention to utilize only natural, non-biological, non-chemical additives to the filtration process of water. In one specific embodiment, filters comprised of natural and native soils are constructed to obtain the appropriate level of purity without adding content to the water or using biological processes. In one embodiment, the natural filtration process of water flowing in, around, or through desirable soils is selectively repeated by diverting natural flow through additional natural or man-made filters at lower elevations. In another embodiment, the natural filtration processes may be aided by the addition of advantageous biologic or chemical substances.

It is a further object of the present invention to obtain water from naturally occurring sources where the gravitational potential energy of the water is utilized in connection with the natural environment to filter and purify the water. In one embodiment, water to be filtered, cleaned, or otherwise used in the present invention is delivered by the force of gravity alone.

It is a further object of the present invention to filter, assess and ensure purity via predetermined criteria, and obtain clean water by channeling glacial water through additional phases of natural filtration through which the water passes largely, if not solely, under gravitational force. This process allows for substantially continuous natural filtration and purification of water without continuous energy consumption from man-made power inputs, resulting in reduced production costs and reduced carbon emissions.

It is a further object of the present invention to implement a filtration and purification process which initially uses source water from strategic geographic locations, such as those regions of Earth that are not generally impacted by carbon emissions and other pollutants produced by industrialized countries due to the physical location of the source and prevailing winds. In a preferred embodiment, the present invention includes a method whereby only water from desirable latitudinal locations of the Earth is selected for filtration and/or processing.

It is yet another object of the present invention to produce safe and healthy drinking water with signature characteristics of the geographic location from which it originated. In certain embodiments, water treated in accordance with the method/system set forth herein may have added to it particular "markers," or have certain characteristics or "markers" enhanced to provide later evidence and proof of at least one of origin, quality, source, purity, geological formation, treatment regimen, latitudinal characteristics, mineral content, extra territorial content, etc. In such a manner, counterfeiting of legitimate water can be deterred, prevented, and/or investigated.

It is another object of the present invention to procure water for distribution which is of sufficient purity, without being subjected to chemical or biological treatments, that it may be reasonably calculated or asserted to contain amino acids and other compounds that can form the building blocks of life. Furthermore, the present invention contemplates employing known methods for evaluating and detecting the presence of these and other compounds in order to affirmatively establish their presence.

To facilitate best mode and written description concerns, various aspects of how to make and use the present invention can be better understood by referring to the particular prior art systems. For example, U.S. Pat. No. 7,332,082 to Brandlmaier discloses a chemical-free method of treating and keeping clean water and is hereby incorporated by reference in its entirety. Brandlmaier discloses a method of transporting water to different filter stages by gravity. However, Brandlmaier necessarily involves a biologic filter, such as a planted ground filter, as one phase of the filtration process before optionally returning the water to a swimming facility.

U.S. Pat. No. 7,569,148 to Elefritz, Jr. et al. discloses a method of treating wastewater utilizing sequence batch reactors and membrane filters, and is hereby incorporated by reference in its entirety. Elefritz, Jr. et al. teach a filtration system that requires a biological reactor, thereby requiring additional production costs as compared to the present invention.

U.S. Pat. No. 7,077,963 to McConchie et al. discloses a process for treating acidic water containing dissolved organic solvents and is hereby incorporate by reference. McConchie et al. fails to teach a method for treating water that does not require the addition of substances. In this manner, McConchie et al. fails to teach at least some of the novel aspects of the present invention.

U.S. Pat. No. 5,032,261 to Pyper discloses a system for filtering bacteria and preparing drinking water and is hereby incorporated by reference. Pyper discloses a system that includes biological filtration and does not rely upon gravity as a source of energy input.

U.S. Pat. No. 4,564,450 to Piper et al. discloses a modular array of filter elements for treating water and is hereby incorporated by reference. Piper et al. disclose a quadrilateral module. Accordingly, Piper et al. teach away from aspects of the present invention which are not confined to quadrilateral arrays.

U.S. patent application Ser. No. 12/465,193 to Mitchell et al. discloses a method for filtering and removing bacteria from water and is hereby incorporated by reference. Mitchell et al. disclose a system that involves a filter housing comprising mesoporous activated carbon. Mitchell et al. fail to teach novel aspects of the present invention. As one of ordinary skill in the art will appreciate, various aspects of the above systems can be employed in practicing different embodiments of the present invention.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below.

In one embodiment, a method for trading water is provided, the method generally comprising: (a) connecting a first entity desiring to obtain water having at least one specific characteristic with a second entity having possession of a source of water comprising the at least one specific characteristic; (b) conveying from the first entity to the second entity information relating to the quantity and characteristic of the desired water; (c) based on the information conveyed, transferring title to a quantity of water having the desired specific characteristic that the second entity is willing to transfer, from the second entity to the first entity, wherein the second entity receives compensation in an amount related to the quantity of water covered by the transferred title.

In various embodiments, the entities involved in the claimed method can be individuals or groups of individuals such as corporations, partnerships, agencies, non-profit agencies, and the like, or combinations thereof. Moreover it should be noted that the composition of one entity of a method of the present invention is independent of the composition of the other entity. That is, for example, the first entity may be an individual while the second entity may be a company. Any such combination is contemplated. It is also contemplated that the role performed by the two entities of the claimed invention be conducted by the same entity, as certain advantages of such an arrangement could result. By way of example and in further support of the present disclosure, U.S. Patent Application Publication No. 2010/0063902 to Constantz et al. is incorporated herein by reference in its entirety.

As used herein, the terms connecting, connect, linking, link, and the like mean that the two entities interact in such a way as to allow a two-way transfer of information. Any means of connection that allows communication between the entities can be used to practice the present invention. In one embodiment, the connection is formed using an electronic device. Any electronic device is suitable so long as it allows communication between the entities. Examples of useful electronic devices include, but are not limited to, data transmission devices, telephones, cellular phones, facsimile machines, and computers.

In various embodiments, the two entities connect through an exchange. As used herein, an exchange is a collective, institution, organization, or association which hosts a market where stocks, bonds, options and futures, commodities, and the like, are traded. Buyers and sellers come together in the exchange to trade. In the present invention, an exchange is envisioned as trading water or rights therein, although the trade of other stocks, bonds, options and futures, commodities and the like, may also occur within the same exchange. Such an exchange can be located at one or more physical locations that may or may not be connected by means of communication, such as telephone or data transmission lines. In addition, such exchanges can lack a physical location, such as a building, and exist solely on a network such as, for example, a computer network. It should also be understood that an exchange may refer to an existing exchange (e.g., The New York Stock Exchange, The Chicago Mercantile Exchange, etc.), or it may refer to an entirely new exchange.

With regard to the present invention, water refers to water having one or more characteristic that renders it desirable to a consuming population. In one embodiment, the characteristic possessed by the water has high degree of purity. A high degree of purity refers to water that is substantially free of harmful contaminants. A contaminant is any substance in the water deemed undesirable by the purchaser of the water. Examples of contaminants include, but are not limited to, heavy metals, including transition metals, metalloids, lanthanoids, and actinides (e.g. Mercury, Lead, Chromium, etc.), uranium, arsenic, chlorine, trihalomethanes (THM's), uranium, PCBs (polychlorinated biphenyls), nitrate, nitrite, pesticides, herbicides, volatile organic compounds, carbon emissions from coal and petroleum fired power plants, and harmful microorganisms such as coliform bacteria, giardia, and cryptosporidium. While it will be recognized that certain contaminants may be more or less harmful to different individuals, substantially free of harmful contaminants means that the source contains such a low level of contaminants as to not cause illness or harm to an adult human when up to 64 fluid ounces are consumed on a daily basis. Methods of determining and quantifying purity are known in the art. For example, contaminants can be measured in parts per million (ppm). In one embodiment, contaminants are present in the water at a level of no more than 1000 ppm, 500 ppm, 250 ppm, 100 ppm, 75 ppm, 50 ppm, 25 ppm, 10 ppm, 5 ppm, 2.5 ppm, or 1 ppm. Such levels can also be expressed in terms of percentages. For example, 1 ppm is equal to 0.0001% on a volume per volume or weight per volume basis. In one embodiment, contaminants are present in the water at a level of no more than 5%, 2%, 1%, 0.5%, 0.1%, 0.05%, 0.025%, 0.01%, 0.0075%, 0.005%, 0.0025%, 0.001%, 0.0005%, 0.00025%, or 0.0001%. Methods of measuring such levels of contamination are known to those skilled in the art. It should be recognized, however, that the present invention is not limited to any type or purity of water. Rather, any water or liquid having a market value is contemplated by various embodiments of the present invention. One of skill in the art will recognize various substances considered to be "harmful" or undesirable for consumption as used herein. For example, the United States Environmental Protection Agency has enumerated a number of these contaminants. These contaminants are incorporated herein by reference and represent examples of some contaminants to which the present invention is concerned.

In one embodiment, the high level of purity is the result of natural processes such as, for example, filtration through soil. By selecting a water source of sufficient initial purity, natural and organic filtering can be applied to produce high quality potable water without the use of sterilization chemicals or energy intensive filtration means. It is known that soil acts as a natural filter of water. In addition to the mechanical capturing of solid particles, the term filtering in this context also involves retaining chemicals, transforming chemicals, and restricting the movement of certain substances. These acts of filtering are often known as soil attenuation. Soil attenuation includes the ability to immobilize metals and remove bacteria that may be carried into the water through such means as human or mammalian waste. It is further known that fine textured soils, such as clay, provide superior filtration of water when compared to large grained or coarse soils such as sand. Water travels through coarse soils more rapidly, thereby reducing contact between the water and soil and thus reducing filtration or attenuation. Permeability is a typical measure of a soil's ability to transmit water and other fluids. Clay is known to have a relatively low permeability as a result of its small grain size and large surface area, causing increased friction between water transmitting through the clay. Clay may have a permeability, or hydraulic conductivity, as low as $10^{-9}$ centimeters per second whereas well sorted sands and gravels typically have a permeability of $10^{-3}$ to 1 centimeter per second.

One of skill in the art will recognize that storage, as well as transport, of commodities is an important and necessary feature of trading systems. Therefore, it is yet another aspect of the present invention to provide means for mooring, stabilizing, and/or parking devices adapted for use with the present invention. For example, U.S. Patent Application Publication No. 2004/0157513 to Dyhrberg, which is hereby incorporated by reference in its entirety, discloses a mooring system for mooring a vessel to a floor portion of a body of water. These and similar devices may be incorporated into various embodiments described herein in order to accommodate, for example, issues related to dock or on-shore storage restrictions, weather and tidal conditions, unpredictable transit times, legal and insurance issues related to positioning a device on-shore or at a dock, and physical restrictions associated with shallow water ports. As used herein, a substantially immovable object refers to mooring devices (despite their general ability to drift or float within a certain radius) as well as more traditional fixed objects such as docks, land, anchored vessels, anchors, etc.

In an alternative embodiment, the present invention comprises the ability to be oriented in a substantially vertical position, either when in a filled or emptied state, due to a portion of the towed vessel being capable of decreasing its buoyancy by the intake of various materials. Such a device comprises a two-way valve which enables the selective control of the buoyancy of one longitudinal end of the vessel and thus provides for ease of storage and protection of the vessel and its contents.

One of skill in the art will recognize that where quantities of water are to be stored, degradation of water quality may become a concern. Accordingly, various embodiments of the present invention contemplate a device which is adapted for preventing growth and propagation of mold, mildew, algae and other deleterious effects caused over time to a quantity of water. By way of example and to further provide support and disclosure, the following references are incorporated by reference in their entireties: U.S. Pat. No. 7,731,847 to Huy, U.S. Pat. No. 5,229,005 to Fok et al., U.S. Pat. No. 4,512,886 to Hicks et al., U.S. Pat. No. 6,580,025 to Guy, U.S. Pat. No. 7,690,319 to Wingate, U.S. Pat. No. 7,686,539 to Aristaghes et al.

In one embodiment, a water storage device of the present invention is adapted for storage in a vertical manner (i.e. wherein a longitudinal axis of a bag is disposed substantially vertically and extending into a depth of a body of water). In this embodiment, the bag or vessel comprises various features for circulating or distributing water throughout. For example, features as described in U.S. Pat. No. 6,580,025 to Guy may be incorporated into storage and transportation devices of the present invention. One of ordinary skill in the art will recognize that when a device is positioned generally longitudinally in a body of water, the lower regions of the device will be cooled due to the water at greater depths being of generally lower temperatures. Accordingly, a device stored longitudinally will generally adopt a thermocline similar to the body of water in which it is disposed, unless acted upon by additional forces/features. Therefore, in one embodiment, convection currents are induced within a water storage device by supplying, for example, thermal energy to a lower portion of the storage unit, thereby causing water in the lower portions of the device to heat, expand, and rise to the top, creating convection currents and reducing deleterious effects caused by allowing a volume of water to remain stagnant.

In various embodiments, devices of the present invention comprise the ability to convert and/or utilize energy from naturally occurring resources such as solar, wind, wave, and thermal resources. In various embodiments, energy captured and/or converted from these sources may be used for various on-board functions, such as propulsion, heating, and various purification techniques.

In one embodiment, a vessel comprises photovoltaic arrays adapted for converting solar energy into forms of energy which may be used throughout the device and/or system. For example, solar energy may be captured, concentrated, and/or converted in a manner that allows for heating of a submerged volume of water (i.e. via thermal energy, electrical energy, or various combinations thereof) and the subsequent creation of convection currents throughout the system.

It is known that when pliable vessels are used to tow or transport volumes of water, wave propagation through the body of water and/or stored volume of water can present undesirable complications. Accordingly, various embodiments of the present invention comprise wave damping features adapted to reduce such effects. For example, various devices and features described in U.S. Pat. No. 7,686,539 to Aristaghes, which is incorporated by reference herein, may be utilized with features of the present invention. For example, wave dampening structures may be disposed within water containing vessels and/or positioned around water containing vessels of the present invention.

In various embodiments, the present invention utilizes existing systems and devices of water, liquid, and/or gas transport to convey or store water. For example, in various embodiments, devices and systems may be retro-fitted or reconstructed in such a way to safely and efficiently transport large volumes of water. U.S. Pat. No. 5,727,492 to Cuneo et al, U.S. Pat. No. 5,099,779 to Kawaichi et al., U.S. Pat. No. 7,451,604 to Yoshida et al., U.S. Pat. No. 4,224,802 to Ooka, U.S. Pat. No. 4,331,129 to Hong et al., and U.S. Pat. No. 6,997,643 to Wille et al., U.S. Patent Application Nos. 2008/0110091 to Perkins et al, 2005/0095068 to Wille et al., 2009/0126400 to Pozivil, 2005/0276666 to Wille et al., and 2008/0127654 to Darling et al. are incorporated by reference herein in their entireties.

In certain embodiments, the present invention contemplates devices, methods and systems for utilizing pre-existing Liquefied Natural Gas ("LNG") tankers in a manner that allows the ships to be returned to a point of origin or another location with fresh water after some or all of a payload of LNG has been delivered. Thus, in various embodiments, a novel gas-water exchange system is provided. It is known that LNG tankers may comprise volumes of up to 225,000 cubic meters. Accordingly, in various embodiments, refilling even a portion of a LNG container with potable water can result in provision of a significant amount of highly demanded water to a point of origin or alternative location. As many LNG tankers currently deliver a payload and return empty, re-supplying such vessels with water not only provides economic viability for an otherwise empty return voyage, but also increases the ship's ballast and fuel efficiency.

In one embodiment, one or more bladders are provided wherein the one or more bladders are adapted to be placed within an emptied volume of a LNG shipping container (i.e., tank, hull, etc.) and further filled with water to provide ballast and/or valuable shipping contents for a return or additional voyage. Accordingly, in various embodiments, significant value is provided to shipping activities by supplying a vessel with a valuable return-shipment, such as water. In one embodiment, at least portions of LNG contained within a LNG tanker are emptied or extracted at the appropriate location (e.g. a regasification plant). Thereafter, emptied portions of a LNG shipping vessel or container are provided with a liner suitable for preventing or minimizing contamination from previously and/or contemporaneously stored gas. For example, various liners available from Fab-Seal Industrial Liners, Inc. may be provided to accommodate water to be stored within a LNG tank and isolate the water from various materials, gases, debris, etc. Liners suitable for use in the present invention include, but are not limited to, P.V.C. flexible membrane liner materials.

In various embodiments, bags or liners for isolating water or liquids may be fabricated in any desired manner, including in a completely flattened conformation. For example, two sheets of fabric may be cut to the desired plan shape and joined at their adjacent edges by suitable means consistent with the material of construction. For example, heat welding or solvent welding may be used if certain polymeric materials have been employed as the substance coating the fabric. Sewing may be necessary in addition. It is possible that the overall cost of a bag may be reduced if the center section and the edges are fabricated separately, i.e., not the flattened conformation.

In various embodiments, the bag is not a body of revolution or, in particular, tubular. In various embodiments, the top and bottom surfaces are indistinguishable and the bag or liner may be periodically turned over to equalize damage due to sun, weather, mold, aging, etc.

In various embodiments, liners of the present invention comprise a water-resistant, elastomer-coated mesh material, such mesh material being constructed of polymeric material having some inherent elasticity, such as polyester or nylon. A warp knit mesh construction is preferred in certain embodiments. The mesh material also may be steel mesh, preferably hexagonal netting of drawn steel wire or similar high modulus material, such as extended-chain crystallized polymer.

In various embodiments, the base fabric is provided with an elastomeric coating for the purposes of providing waterproofing as well as protecting the material of construction from ultraviolet degradation and marine growth.

In various embodiments, devices and methods of the present invention may be used to store, as well as transport, quantities of water or consumable liquids. As will be recognized by one of ordinary skill in the art, varying supply and demand for water or other liquids will fluctuate based on numerous conditions. Accordingly, the present invention contemplates methods and systems for housing or storing water off-shore and/or at port. In various embodiments, methods for maintaining purity and sterility of water are provided. For example, in one embodiment, ultra-violet light is periodically applied to stored quantities of water so as to neutralize or destroy various bacteria, viruses and protozoan cysts such as giardia and cryptosporidia.

In various embodiments, LNG shipping containers are utilized to transport large quantities of water. It is known that LNG shipping containers have enjoyed a history of stellar safety. It is estimated that LNG tankers have sailed over 100 million miles without a shipboard death or even a major safety incident. Although water generally does not pose any environmental or significant safety risks in the event of an accident or spill, it is clearly desirable to protect all cargo from risk of loss, contamination, or general diminution in value.

In one embodiment, internal surfaces or portions may be coated with various materials to prevent or minimize risk of cross-contamination. For example, various spray-coatings may be applied once a quantity of LNG is emptied from a portion of the vessel to create a virgin surface for the holding and contacting with water or similar fluid cargoes. By way of example, industrial water-proof coatings provided by the Procachem Corporation may be provided to coat, cover, or seal a surface that was exposed to or in contact with LNG so as to render the surface capable of accommodating water without significant risk of cross-contamination. In various embodiments, internal volumes of storage tanks or similar structures are coated with a layer of material, the layer of material comprising an appropriate thickness to substantially eliminate the risk of cross-contamination between a liquid or material to be stored and a liquid or material previously stored in the same tank. In various embodiments, the layer of material applied is not so thick as to substantially impact the overall internal volume of the container, tank, vessel, etc.

In one embodiment, one or more tank cleaning apparatus are employed to cleanse the inside of a container or tank. For example, various features as shown and described in U.S. Patent Application Publication No. 2009/0308412 to Dixon, which is incorporated by reference herein, may be employed to prepare various LNG shipping tankers and similar containers for the transport of cargo other than LNG.

One of skill in the art will recognize that various methods and devices of the present invention are not limited to LNG shipping tanks or tankers. Indeed, various methods, features, and systems as described herein may be utilized with a variety of shipping containers and vessels, including, but not limited to, war-ships, recreational vessels, bags, cargo-ships, etc.

In various embodiments, non-rigid structures are utilized to store, transport, and/or convey volumes of water. Applicant hereby incorporates by reference in their entireties U.S. patent application Ser. No. 11/551,125 to Szydlowski, filed on Oct. 19, 2006 and U.S. Provisional Patent Application 61/251912 to Szydlowski, filed on Oct. 15, 2009. In furtherance of the present disclosure, the following references are incorporated by reference herein in their entireties: U.S. Pat. No. 7,500,442 to Schanz, U.S. Pat. No. 6,047,655 to Cran, U.S. Pat. No. 6,330,865 to Cran, U.S. Pat. No. 6,550,410 to Reimers, U.S. Pat. No. 5,488,921 to Spragg, U.S. Pat. No. 6,293,217 to Savage et al., and U.S. Pat. No. 5,197,912 to Lengefeld. In various embodiments, non-rigid structures adapted to contain water are utilized to store, transport, and otherwise accommodate water.

In various embodiments, methods and systems for conveying water in, over, and under land are provided. For example, in various embodiments, it is contemplated to utilize pre-existing easements and/or passageways, such as railway easements, for conveying water or similar liquid products of value to various locations. In one embodiment, a novel trench-digging system is provided on one or more portions of a railway car. By way of example, and for further enabling support of the present disclosure, the following references are hereby incorporated by reference in their entireties: U.S. Pat. No. 4,713,898 to Bull et al., U.S. Pat. No. 4,563,826 to Whitaker Jr., U.S. Pat. No. 4,890,958 to Dancer, U.S. Pat. No. 4,736,534 to Daniels et al., and U.S. Pat. No. 3,967,396 to Maisonneuve et al.

In one embodiment, a method for trading water is provided, the method comprising: (a) connecting a first entity desiring to obtain water having at least one specific characteristic with a second entity having possession of a source of water comprising the at least one specific characteristic; (b) conveying from the first entity to the second entity information relating to the amount and characteristic of the desired water; (c) based on the information conveyed, transferring title to an amount of water having the desired specific characteristic that the second entity is willing to transfer, from the second entity to the first entity, and the second entity receives compensation in an amount related to the amount of water covered by the transferred title.

In various alternative embodiments, the water possessed by the second entity is sequestered in a form other than a liquid. For example, in various embodiments, the water possessed by the second entity is sequestered as ice.

In various embodiments, the specific characteristic of water to be obtained is selected from the group consisting of: being from a specific geological time period, having a specific purity, comprising a specific nutrient, and having been purified by filtration through native soils. In various embodiments, the second entity has ownership in the water comprising the at least one specific characteristic.

In various embodiments, the step of conveying is performed using an electronic device, such as, for example, a computer network. In some embodiments, the step of conveying comprises an exchange.

In one embodiment, a method of trading water is provided where the water is sequestered as ice, and following transfer of title, an amount of water covered by a title is recovered from the ice.

In yet another embodiment, a method of trading water is provided comprising: (a) connecting a first entity desiring to obtain water having at least one specific characteristic with a second entity having possession of a source of water comprising the at least one specific characteristic; (b) conveying from the first entity to the second entity information relating to the amount and characteristic of the desired water; (c) based on the information conveyed, transferring title to an amount of water having the desired specific characteristic that the second entity is willing to transfer, from the second entity to the first entity, and the second entity receives compensation in an amount related to the amount of water covered by the transferred title; and (d) transferring physical possession of the water to the first entity.

In various embodiments, a method is provided wherein the water is transferred to a geographic location different from the location at which it is possessed by the second entity. Additionally, in various embodiments, physical transfer of the water comprises a tanker, bag, or similar vessel adapted for transporting a large volume of water.

In various embodiments, a method of shipping is provided, the method comprising a first location, a second location, and a shipping vessel. In particular embodiments, the first location comprises substantial quantities of natural gas and the second location comprises substantial quantities of water. Shipping vessels of the present invention may therefore be provided with cargo comprising natural gas at a first location and transported to a second location. Subsequently, in various embodiments, a shipping vessel is at least partially emptied of the cargo comprising natural gas and provided with cargo comprising water at the second location. In various embodiments, the shipping vessel is transported from the second location back to the first location.

In alternative embodiments, a method of shipping is provided wherein cargo comprising water has a first value and cargo comprising natural gas has a second value, and a purchase price of the cargo comprising natural gas is offset by the difference between the second value and the first value.

In various embodiments, shipping vessels employed by the present invention are adapted for the transportation of liquefied natural gas. In various embodiments, the shipping vessel(s) is adapted for the transportation of fresh water for at least a portion of the vessel(s) journey.

In one embodiment, a method of trading and transporting water is provided, the method generally comprising a trading platform for identifying areas of high water supply and/or low value supply. In various embodiments, the platform, which may take the form of an electronic database, identifies areas of low water supplies and/or areas where water would be considered "high value." For example, in various embodiments, a method and system of the present invention may comprise a platform for determining areas or entities having large quantities of water available for shipment Water trading platforms, such as those available through Waterfind Water Market Specialists of Australia, are generally known for bringing potential buyers and sellers of water and/or water rights together. Various features, systems, and methods of the present invention further contemplate connecting individuals and entities across great distances and transporting or conveying water across such distances. Accordingly, various features, systems, and methods of the present invention provide worldwide liquidity to any number of water markets. In various embodiments, water trading is expanded beyond simple irrigation districts, watersheds, counties, and even countries. The present invention contemplates a global water market wherein buyers and sellers are connected regardless of spatial relationships. Thus, for example, whereas relatively small regions having disparate climates and water supplies/needs may benefit from traditional water rights trading systems (e.g. where water may be diverted through local infrastructure), the present invention contemplates connecting individuals, entities, and states whether they be separated by a matter of feet or a few thousand miles. Furthermore, in various embodiments, a method and system is provided wherein a first entity is connected with a second entity, the first entity having a supply of water, the second entity having a supply of a different resource, and wherein water may be conveyed from the first entity to the second entity and the price offset or otherwise impacted by a value and quantity of the different resource. Applicant hereby incorporates by reference in their entireties U.S. patent application Ser. No. 11/551,125 to Szydlowski, filed on Oct. 19, 2006 and U.S. Provisional Patent Application 61/251912 to Szydlowski, filed on Oct. 15, 2009.

Devices for transporting a single large volume of water or liquid in and through the Earth's waterways have been contemplated. For example, U.S. Pat. No. 6,550,410 to Reimers, which is hereby incorporated by reference in its entirety, discloses a system and method for storing and conveying fluids, where the system is adapted for towing by marine crafts in offshore conditions. Reimers further discloses a collapsible fluid container with an elongated shape, towing, and mooring means, as well as container retrieval, storage and deployment means. Reimers, however, does not teach various novel features of the present invention, including, but not limited to, locating means, rapid filling and/or emptying means, and means for preserving the purity and integrity of fluids to be housed within.

Similarly, U.S. Pat. 7,500,442 to Schanz, which is hereby incorporated by reference in its entirety, discloses a submerged transport and storage system for liquids and solids. Schanz discloses a towable vessel with optional air and liquid storage bladders useful for adjusting buoyancy and allowing simultaneous transport of different solids and liquids. Schanz further discloses a cord-like connecting spine passing through the hull towing attachment ends to provide longitudinal reinforcement and prevent undesired distortion of the vessel during towing. Schanz, however, fails to teach a device which may be readily transported and/or stored when not in use. Furthermore, Schanz also fails to teach a device with means for locating the towed vessel.

U.S. Pat. Nos. 6,047,655 and 6,330,865 to Cran, which are hereby incorporated by reference in their entireties, disclose a flexible barge. These references disclose system comprising a flexible barge structure with a system of straps to prevent propagation of rips and to distribute concentrated tow forces over the bag. Cran fails to teach several novel aspects of the present invention.

U.S. Pat. No. 2,391,926 to Scott, which is hereby incorporated by reference in its entirety, discloses a non-rigid barge for transporting fluids and other materials by water. Scott also discloses an upper surface or deck of the barge equipped with radio controlled lights or other means for navigational purposes. Scott, however, fails to teach a device comprising means for rapid filling and emptying of fluids and other substances, signaling or other locating means outside of those for purely navigational purposes, means for filtering and/or preserving the integrity of liquids housed within, and means for storing and transporting the towed vessel when not in use.

Additionally, U.S. Pat. No. 6,293,217 to Savage et al., which is hereby incorporated by reference in its entirety, discloses an apparatus and method for transporting fluid cargo through liquid. Savage et al., discloses an apparatus consisting of one or more units in substantially linear alignment, wherein at least one of the units includes two or more non-internally reinforced containers coupled in a side by side manner. Savage et al., further discloses various close coupled configurations of a plurality of fluid containing units, but fails to teach various novel aspects of the present invention, such as means for signaling, identifying, and/or locating a lost fluid containing unit, means for rapid filling and/or emptying of a device, and means for preserving the integrity of water or other contents contained within the device.

U.S. Pat. No. 5,488,921 to Spragg, which is hereby incorporated by reference in its entirety, discloses a flexible fabric barge apparatus and method for transporting fluent cargos. More specifically, Spragg discloses a series of flexible fabric barges that are connected together in a string for towing and further include a fabric towing cone zipper connected to the lead barge. Spragg, however, fails to disclose various novel features of the present invention.

It is an object of the present invention to provide an at least partially submersible, towed vessel capable of transporting volumes of fluent cargos, such as potable water, juice, wine, and/or various other fluids suitable for human use and consumption.

It is yet another object of the present invention to provide a device suitable for containing large volumes of fluent cargos that is further capable of being towed by various water craft.

It is yet another object of the present invention to provide a towed fluid containing vessel further comprising means to facilitate the rapid filling and emptying of fluids to be contained within. In one embodiment, the present invention comprises a plurality of ports through which a liquid and/or air/gas are conveyed to facilitate the rapid emptying and/or filling of such devices.

It is yet another object of the present invention to provide a water towed vessel further comprising means for signaling a physical position of the vessel. For example, means may be provided to signal to other vessels or individuals the presence and location of the vessel. In one embodiment, lighting means and beacons are disposed on a dorsal portion of a vessel to indicate the presence of the vessel to nearby persons and other vessels. Additional devices, such as nets, buoys, and gated systems, for example, may be deployed around a perimeter of the device to alert various individuals and vessels of the presence of the vessel and/or a vessel's sub-surface presence. U.S. Pat. No. 5,197,912 to Lengefeld discloses a buoy for attachment to the net line of a fishing net and is hereby incorporated by reference in its entirety. Devices disclosed in Lengefeld and those similar may be employed in various features and embodiments of the present invention. For example, a ring or net with marker buoys useful for keeping the ring/net afloat and simultaneously serving as a visual indicator may be employed.

Additionally, means may be provided in association with the vessel to convey information to users or devices at various locations throughout the world regarding the coordinates or relative position of the towed vessel, such as through global positioning systems ("GPS") and other similar devices. Thus, in one embodiment, the present invention comprises light-emitting devices for signaling a position of the device as well as at least one GPS transmitter for broadcasting/transmitting a location of the device.

In an alternative embodiment, devices of the present invention comprise at least one GPS transmission device which is in communication with a network or database that is further accessible by various additional devices. Additional devices of the present invention may include, for example, computer terminals, handheld devices, and a variety of other devices capable of receiving GPS information. Thus, embodiments of the present invention may be tracked by any number of individuals or systems throughout the world.

It is yet another object of the present invention to provide means for ease of storage and/or transportation of the towed vessel when not in use for transporting fluent cargos. Such means may include, for example, the ability to fold, roll, or compress the present invention for ease of storage and/or transportation when towing is not desired or needed. In an alternative embodiment, the present invention comprises variable buoyancy control which allows for the adjustment of buoyancy at one or more locations of the device. For example, when a device of the present invention is empty, one longitudinal end of the device may be deprived of buoyancy, while an opposing longitudinal end is allowed to remain buoyant, thus allowing the elongate shape to be positioned in a generally vertical position. In this manner, the device is capable of occupying less area at the surface of a body of water.

In another embodiment, the present invention comprises reinforcing straps secured to at least a portion of the device which are further adapted to accommodate and/or distribute stresses applied to the vessel while being towed. In one embodiment, the reinforcing straps are securely connected with a towing portion of the device and extend radially outward along at least a portion of the vessel's longitudinal length.

It is known that various regions of the Earth which greatly desire and/or require water (for example) are generally devoid of the large-scale infrastructure that is often necessary to quickly extract the contents of a large vessel. Accordingly, embodiments of the present invention include various means for short or long-term off-shore storage. In one embodiment, the present invention is stationed in the proximity of an area in need of water or similar fluids (e.g. a disaster area) in an off-shore location via the use of mooring or substantially immovable objects. Contents of the device are then extracted from the device on an as-needed basis and conveyed to an on-shore location via smaller vessels or temporary conduits (e.g. PVC or similar piping).

In an alternative embodiment, the present invention is capable of selective communication with fixed on-shore infrastructure and devices capable of emptying and subsequently storing the entirety of the volume of a towed vessel. For example, conveying/emptying devices disclosed in U.S. Pat. No. 6,550,410 to Reimers, which is hereby incorporated by reference in its entirety, and those similar may be employed in various embodiments of the present invention.

It is yet another object of the present invention to provide means for filtering fluids to be contained within the device. Such filtering may comprise, for example, filtration upon entrance of the fluid into the vessel, filtration during transport of the fluid, and/or filtration of the fluid upon exit from the vessel. In one embodiment, indigenous (i.e. with respect to the fluids originating source) soils, sands, clays, etc. are provided within or in combination with filters at the entry and exit points of a towed device, thereby forcing water to be conveyed through a natural filter upon entrance and/or exit from a towed device. In one embodiment, disposable filters are provided which may be discarded and/or have filtration contents replaced after a certain number of filtration passes.

It is yet another aspect of the present invention to provide means for mooring, stabilizing, and/or parking devices of the present invention. For example, U.S. Patent Application Publication No. 2004/0157513 to Dyhrberg, which is hereby incorporated by reference in its entirety, discloses a mooring system for mooring a vessel to a floor portion of a body of water. These and similar devices may be incorporated into various embodiments described herein in order to accommodate, for example, issues related to dock or on-shore storage restrictions, weather and tidal conditions, unpredictable transit times, legal and insurance issues related to positioning a device on-shore or at a dock, and physical restrictions associated with shallow water ports. As used herein, a substantially immovable object refers to mooring devices (despite their general ability to drift or float within a certain radius) as well as more traditional fixed objects such as docks, land, anchored vessels, anchors, etc.

In an alternative embodiment, the present invention comprises the ability to be oriented in a substantially vertical position, either when in a filled or emptied state, due to a portion of the towed vessel being capable of decreasing its buoyancy by the intake of various materials. Such a device comprises a two-way valve which enables the selective control of the buoyancy of one longitudinal end of the vessel and thus provides for ease of storage and protection of the vessel and its contents.

In another embodiment, the invention comprises structures capable of stabilizing towed vessels in a generally vertical arrangement (e.g. for storage). For example, in one embodiment, a first end of a towed vessel is secured to a substantially immobile device and a second end of a towed vessel is secured to means adapted for altering the depth of the second end. In this embodiment, the second end of a substantially empty towed vessel may be selectively transmitted to a submerged position and the towed vessel oriented in a substantially vertical position. Embodiments of the present invention further allow for the vessel to be re-surfaced by, for example, actuating the means adapted for altering the depth of the second end of the vessel. Means adapted for altering depth may be comprised of various known devices comprising at least one linear translation element. For example, worm gears adapted for use in translating associated nuts, pulley systems, hydraulic jack or elevator devices, rail actuators, and various other known devices may be incorporated into embodiments of the present invention. Thus, in one embodiment, the present invention comprises a towed vessel with an elongate shape, a first end adapted for communication with a mooring device that is free to translate within a given radius, and a second end adapted for communication with a linear translation device that selectively adjusts the depth of at least the second end of the vessel.

In one embodiment, water located at greater depths which is known to be of cooler temperature is allowed to cool a volume of fluid or air disposed within a submerged portion of the present invention, thus providing for additional vertical anchoring capabilities. Various selectively controlled valves are useful for further controlling buoyancy. For example, in one embodiment, once a towed vessel is oriented in a generally vertical position, colder/denser water proximal to a submerged location is drawn into at least a portion of the vessel, facilitating vertical storage of the device. User operated valves are further capable of being activated in order to dispel said colder/denser water when the vessel is to be repositioned generally parallel with a surface.

Those of skill in the art will recognize that oceanic thermoclines and haloclines may be taken advantage for the storage, convection, etc. of various embodiments of the present invention. In one embodiment, water or fluid disposed in a submerged portion of the vessel may be heated, thus inducing convection currents within a towed device and preserving integrity of the water. Density of water, which is defined as Mass/Volume ($g/cm^3$) may be accounted for, adjusted, and otherwise modified in various embodiments of the present invention. It is further known that seawater is denser than freshwater, thus facilitating the transport of a contained volume of freshwater through a denser body of salt water.

It is yet another aspect of the present invention to provide a towed device which is capable of being transported in series with additional towed devices or consists. Thus, in one embodiment, a towed device comprises the ability to be placed in secure communication with one or more additional towed devices, thereby providing the ability to increase the total volume of a fluid to be transported. In one embodiment, the present invention comprises tracking abilities, such as those described in European Patent No. EP 1,723,021 to Hendrickson et al. which discloses a Rail Car Tracking System and is hereby incorporated by reference in its entirety. Although Hendrickson et al. relates generally to the field of rail transportation, those of skill in the art will recognize that various embodiments as described therein may be applicable to and useful for tracking water-towed vessels of the present invention, whether towed in consists/trains, or towed individually. Tag readers for use in the present invention may be disposed on, for example, docks, buoys, vessels, aircraft, etc. and may be capable of reading information from water-towed vessels related to physical position, contents, temperature (internal or external to the towed vessel, velocity, and other pertinent information).

These and other needs are addressed by the various embodiments and configurations of the present invention. These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below.

BRIEF DESCRIPTION OF THE DRAWINGS

FIG. 8A is a diagram depicting a GPS transmitter on a towed vessel suitable for transporting liquids according to one embodiment;

FIG. 8B is a diagram depicting a remote computing station for processing and displaying information that may reside in a variety of locations, including on other vessels and various fixed on shore locations;

FIG. 8C is a diagram depicting an indicator means capable of alerting crew members that a partially submerged object is in the vicinity of a towed vessel suitable for transporting liquids according to one embodiment;

DETAILED DESCRIPTION OF PREFERRED EMBODIMENTS

Figure 1:
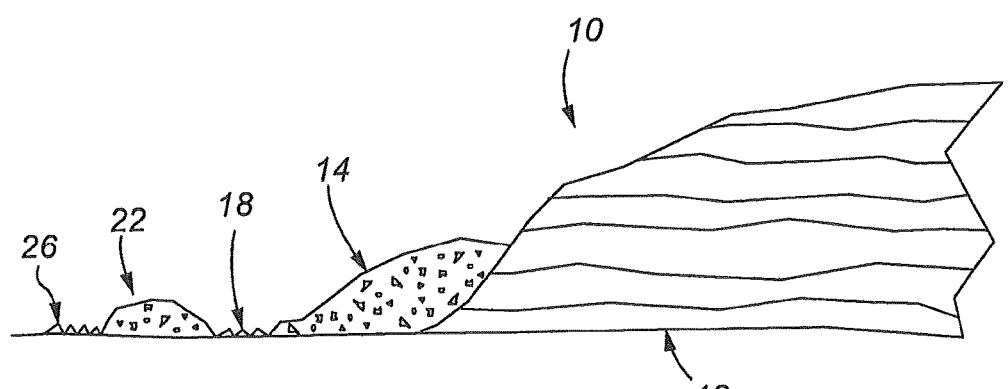
FIG. 1 is a plan view of a natural glacial melt water filtration system, utilizing gravity and additional geologic structural members to provide thorough filtration.

FIG. 1 is a plan view of glacial ice and melt water [12] as it is subjected to colloidal clay filtering. One aspect of the present invention is that the source water [10] is of a high degree of purity at the beginning of the process. With respect to the present invention, a high degree of purity refers to an ice or water source that is substantially free of harmful contaminants. While it will be recognized that certain contaminants may be more or less harmful to different individuals, substantially free of harmful contaminants with the respect to the present invention means that the source contains such a low level of contaminants as to not cause illness or harm to an adult human when up to 64 fluid ounces are consumed on a daily basis. By selecting a water source of sufficient initial purity, natural and organic filtering can be applied to produce high quality potable water without the use of sterilization chemicals or energy intensive filtration means. It is known that soil acts as a natural filter of water. In addition to the mechanical capturing of solid particles, the term filtering in this context also involves retaining chemicals, transforming chemicals, and restricting the movement of certain substances. These acts of filtering are often known as soil attenuation. Soil attenuation includes the ability to immobilize metals and remove bacteria that may be carried into the water through such means as human or mammalian waste. It is further known that fine textured soils, such as clay, provide superior filtration of water when compared to large grained or coarse soils such as sand. Water travels through coarse soils more rapidly, thereby reducing contact between the water and soil and thus reducing filtration or attenuation. Permeability is a typical measure of a soil's ability to transmit water and other fluids. Clay is known to have a relatively low permeability as a result of its small grain size and large surface area, causing increased friction between water transmitting through the clay. Clay may have a permeability, or hydraulic conductivity, as low as $10^{-9}$ centimeters per second whereas well sorted sands and gravels typically have a permeability of $10^{-3}$ to 1 centimeter per second.

FIG. 1 depicts a process by which glacial water [18, 26] is filtered through clay deposits [14] under the force of gravity and is further subjected to additional filtering [22] through clay of the same composition that is selectively positioned by the operator of the current invention. In one embodiment of the present invention, the soil used in filtration is of permeability between 1 and $10^{-12}$ centimeters per second. In a preferred embodiment, soil used in the filtration has permeability approximately between $10^{-5}$ and $10^{-11}$ centimeters per second. In a more preferred embodiment, soil is used in the filtration process that has permeability approximately between $10^{-8}$ and $10^{-10}$ centimeters per second. This additional phase of clay filtration [22] is selectively implemented by the user to create an additional filtration process in an area with sufficient flow rate.

It will be recognized that this additional clay filter need not be of any particular size. Creation of the appropriate sized filter will largely be determined by the user's needs and the natural flow rate of melt water in the particular setting. By taking advantage of the gravitational potential energy of glaciers, ice caps, and the like, the present invention offers a significant advantage over traditional household and commercial filtration processes, such as reverse osmosis, in that the current process does not require energy input generated from hydrocarbon sources. While it will be recognized that initial construction of additional clay filtration stages [22] may potentially require energy input from hydrocarbon fuels, renewable energy sources including human power, or other input, it is an object of the present invention that these filtration stages will operate under the energy provided by gravitational potential energy and the kinetic energy of ice and water.

Figure 2:
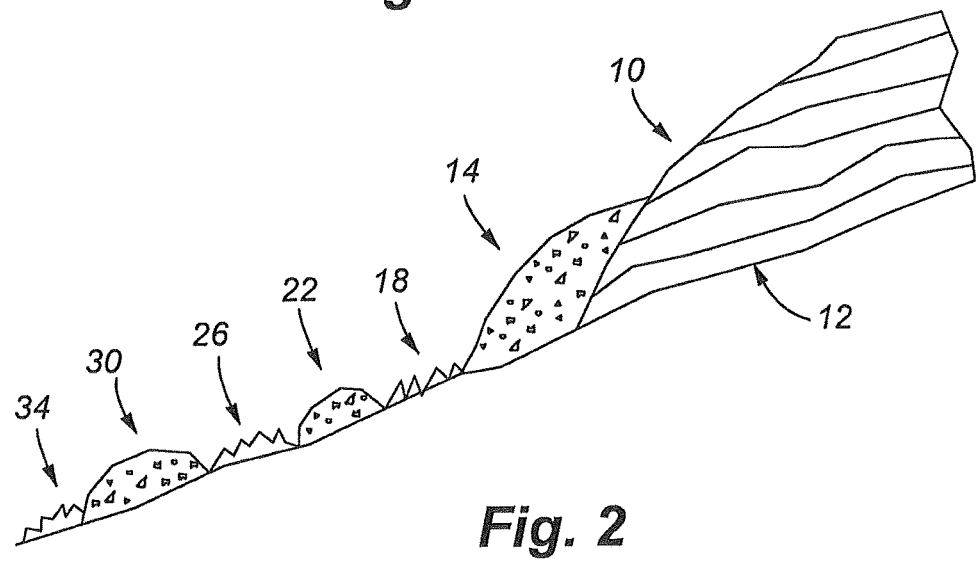
FIG. 2 is a plan view of an embodiment of the present invention using multiple iterations of natural filtration for glacial melt waters.

FIG. 2 depicts an embodiment of the present invention where a plurality of additional clay filters [22, 30] have been constructed to further filter and purify glacial water. It will be known to one of skill in the art that any number of additional filtration phases may be constructed. Accordingly, the present invention may be accomplished as described herein with any feasible number of filters.

Figure 3:
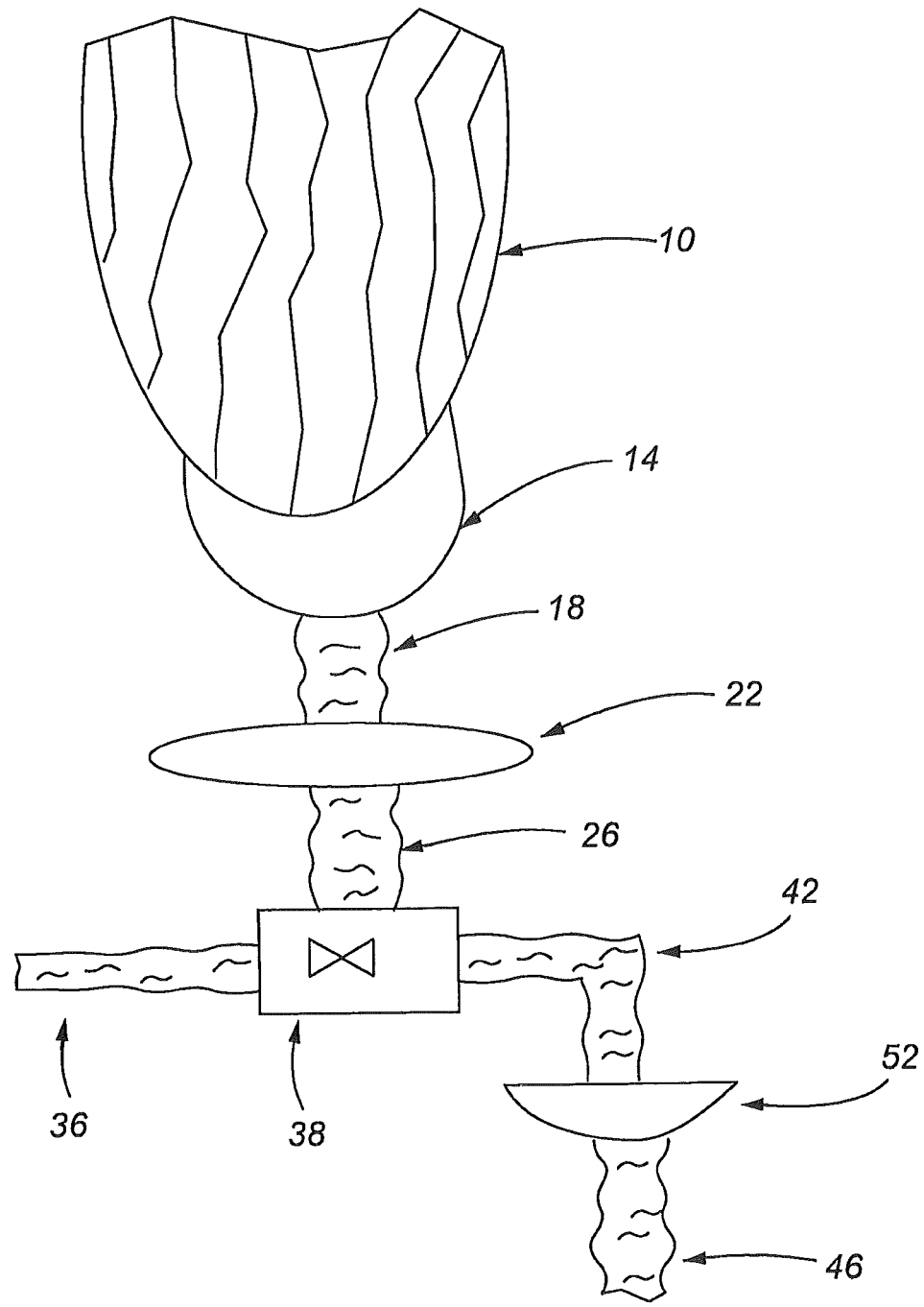
FIG. 3 is a top view of an embodiment of the present invention where glacial ice or water may be selectively diverted through various filters.

FIG. 3 depicts another embodiment of the present invention where the source ice or water [10] is filtered through natural clay [14], further filtered through a constructed additional clay filter [22], and selectively diverted by a control valve [38] based on whether or not additional filtration is desired. The control valve [38] may be selectively adjusted to divert water and ice [36] that the user does not desire to undergo additional filtration to bottling or processing facilities. Alternatively, the control valve [38] may also be selectively positioned so that water and ice [26] are subjected to further constructed filter iterations [32]. The resulting water and ice [46] may then be diverted to processing and bottling facilities, subjected to further filtrations, or subjected to additional control valve and filtration steps as previously described.

Figure 4:
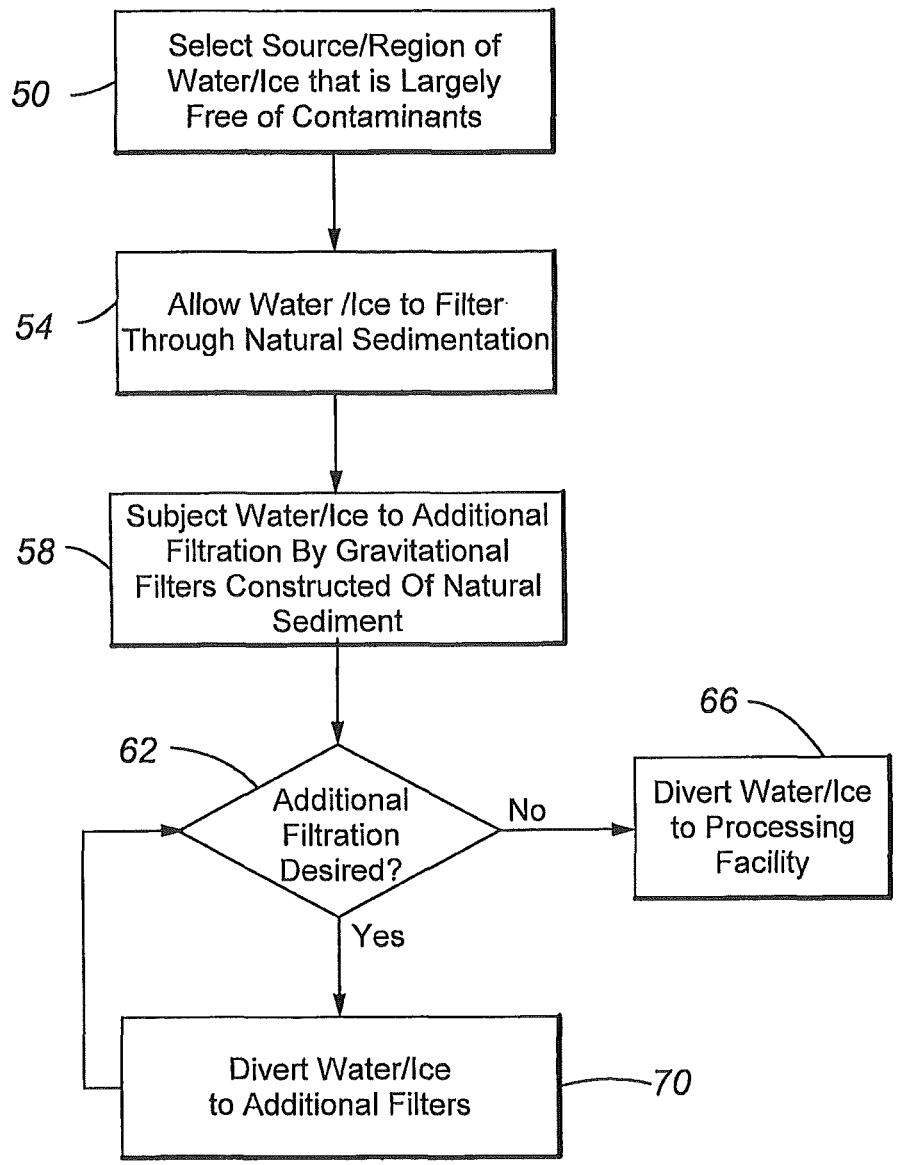
FIG. 4 is a flowchart illustrating one embodiment of the present invention where natural potable water is obtained from glacial ice.

FIG. 4 depicts a flowchart describing the present invention. The initial step [50] involves selecting a glacial body or ice cap of sufficient purity. While it will be recognized that many natural sources of water and ice contain some level of impurity, the present invention contemplates a source that is generally untouched by human and mammalian beings and located in latitudes where emissions from industrialized nations have very little impact. While the present invention is not limited to application in any particular region, glacial ice and ice caps south of 15 degrees latitude are well suited for this process. Once a water source is identified, the present invention contemplates allowing the glacial ice and melt water to channel naturally through sediment in its surroundings [54]. Ideally, this sediment is composed of clay or similar soil which provides a low permeability and naturally filters the water. After this first step of filtration has occurred, the resulting water is then passed through additional man-made sedimentary filters [58]. In one embodiment of the present invention, these filters are composed of the same or similar clay-like soil as in process 54. The water may either be selectively diverted to the additional man-made filters, or the filters may be constructed in the natural path of the water. In various embodiments, this sedimentary filtration [54, 58] is powered solely by gravitational forces. One benefit that will be recognized is the reduced or eliminated need to provide energy input to achieve filtration. Decision block 62 involves a determination of whether the water and ice should be subjected to additional sedimentary filters or diverted to a facility for processing and/or bottling. If additional filtration is not desired, the water may be diverted by, for example, a valve [38] to the processing or bottling facility [66]. One of ordinary skill in the art will realize that this valve may be comprised of a gate valve, ball valve, globe valve, three-way valve, or any valve suitable for diverting water or ice. If additional filtration is desired, the valve may be selectively positioned to divert the water or ice to additional sedimentary filters of the previously discussed composition [70].

Figure 5:
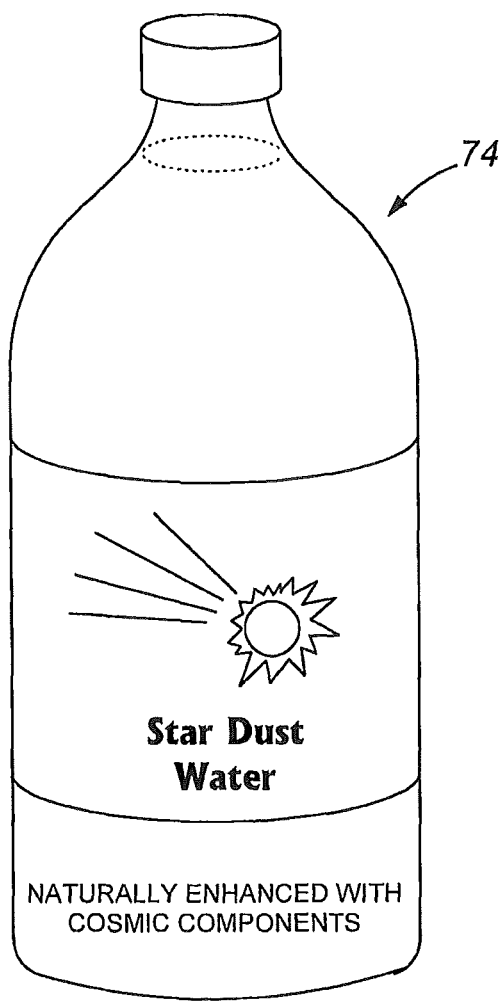
FIG. 5 depicts an exemplary final product in accordance with embodiments of the present invention.

FIG. 5 depicts an exemplary final product [74] of the present invention whereby clean, filtered, potable water is produced without the use of sterilizing chemicals, such as chlorine or iodine, or energy intensive filtration processes. A benefit of the present invention is the ability to produce pure, potable water without destroying, filtering, or eliminating desirable active contents. By filtering the source water by natural sedimentary processes, it is possible to market a product that may contain amino acids, such as glycine and other amino acids traceable to extraterrestrial bodies. With respect to the present invention, extraterrestrial bodies refer to comets, meteors, and other similar bodies. The prospect of producing pure, healthy water with prospect of drinking the original building blocks of life on Earth holds significant commercial appeal.

Figure 6:
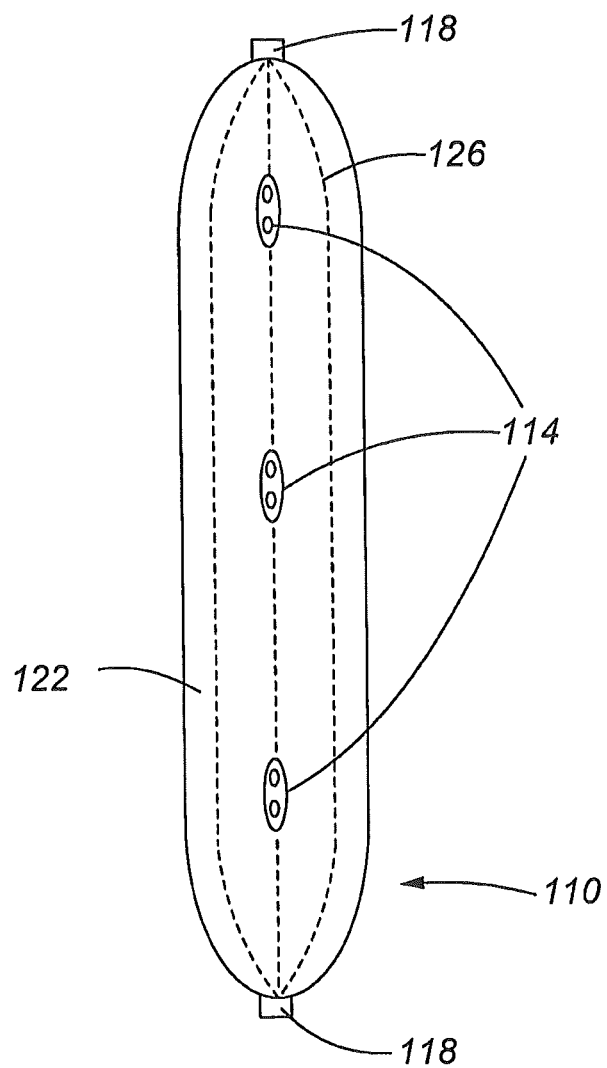
FIG. 6 is a top plan view of a towed vessel suitable for transporting liquids according to one embodiment.

FIG. 6 depicts a towable vessel 110 for transporting fluent cargoes. In one embodiment of the present invention, a towable vessel 110 may comprise a plurality of ports 114 suitable for the inlet and removal of fluids to be transported.

One of skill in the art will recognize that a plurality of such ports may be useful in fluid removal operations, both as a means to increase the flow rate of fluid into a vessel 110 and/or to allow for air intake into one port 114 while fluid is extracted from another port 114. In some operations, it may be desirable to transport extremely large volumes of fluid. For example, it may be desirable to transport in excess of 35,000 tons of water in a single vessel 110. Accordingly, increased flow rates to and from a vessel may be desirable and stand to increase the overall efficiency of the system and fluid transport operations.

Vessels 110 of the present invention may be comprised of a variety of non-rigid, flexible materials including, but not limited to, urethane, polyurethane, urethane-coated polyesters, thermoplastic urethane coated nylon, vinyl, and other similar materials or various combinations of the same. Those of skill in the art will recognize the various advantages of constructing a vessel 110 of the present invention out of a flexible material, including, but not limited to, the ability to easily store and transport the vessel 110 when it is not in use for transporting liquids.

In one embodiment, a towable vessel 110 further comprises a reinforcing member 118 on at least one node or end of the vessel for attachment to towing members and vessels. Reinforcing members 118 may be comprised of rigid structures fastened to or otherwise connected to a pliable or flexible container 122 and capable of withstanding various tension forces imparted to the vessel 110 during towing. Reinforcing members 118 may further be connected to reinforcing seams 126 which travel through a longitudinal length of a towable vessel 110. Reinforcing seams 126 may be comprised of a variety of known materials, including, but not limited to metal cables, nylon cords, plastics, and various other materials suitable for withstanding tensile loading. Reinforcing seams 126 may transmit and resist forces applied to a towed portion of the vessel 110, thereby reducing unwanted deflection of the vessel 110 and associated drag on the vessel 110.

In an alternative embodiment, a towed vessel 110 comprises an ellipsoid shaped hull (when in a filled state) to reduce drag, at least one air chamber to maintain the vessel in an upright position, one or more ports 114 for filling and/or emptying the vessel, one or more removable bladders capable of containing and segregating different liquids or materials, and one or more devices capable of selectively controlling the amount of air within a portion of the device 110 and corresponding buoyancy.

It will be recognized that the shape of the vessel 110 may take various different forms, depending upon the desired quantity of fluid to be transported, characteristics of the vessel(s) towing the vessel 110, and other factors. However, it will further be recognized that it is desirable to reduce drag in water towing applications. Accordingly, it is known that drag on the vessel 110 will decrease as the wetted surface area and width of the vessel 110 decrease, and while length increases. Therefore, in order to improve towing efficiency, an optimal geometric design may be constructed.

Figure 7:
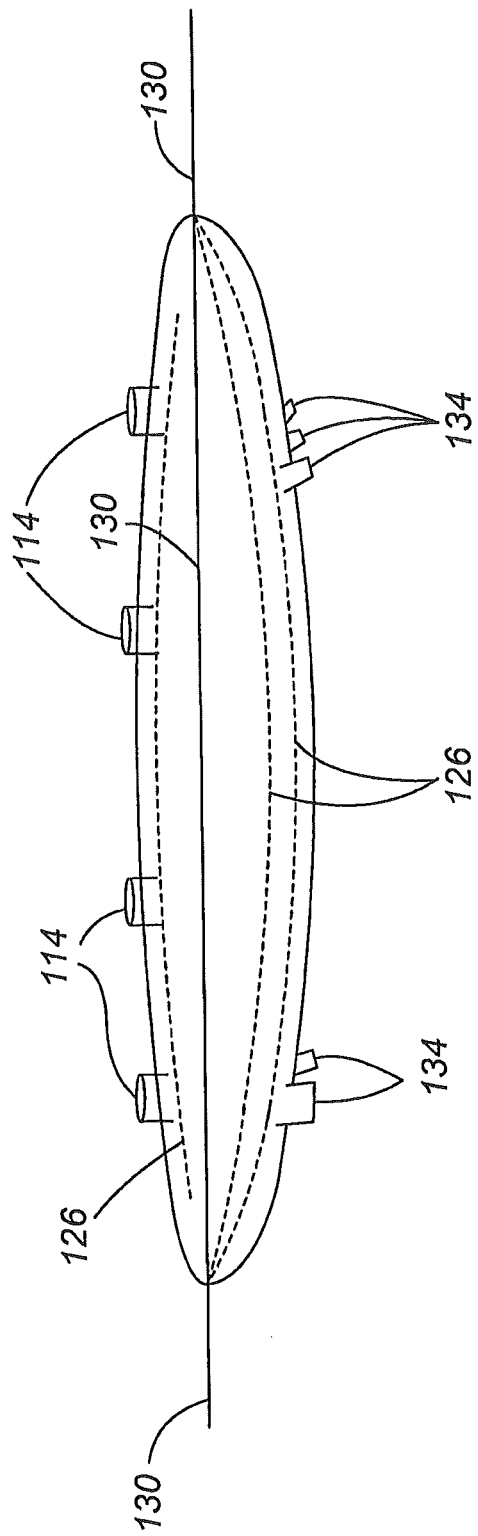
FIG. 7 is a side elevation view of a towed vessel suitable for transporting liquids.

FIG. 7 depicts a side elevation view of one embodiment of the present invention with respect to a water line 130. In water towed operations, it may be desirable to adjust the buoyancy of the object, either due to various environmental conditions or based on the amount of water contained within the vessel 110. Accordingly, the present invention contemplates operating a vessel 110 at various depths within a body of water. Variable buoyancy may be obtained, for example, through the use of a dorsal bladder (not shown) which contains air or a gas of lower density than a material to be towed, which both maintains the vessel 110 in an upright position and provides a certain amount of buoyancy relative to the vessel's surroundings. Alternatively, air or gas may be housed within a main portion of the device 110 to provide similar functionality.

In one embodiment, ports 114 include the ability to exhaust and intake air based on a desired level of buoyancy. For example, one or more ports 114 are equipped with means, such as reversible impellers to draw air in or exhaust air from a previously disclosed bladder or from one or more fluid containing compartments of the invention 110.

Buoyancy may be adjusted, for example, when various environmental conditions change. In long-distance open sea transit, it is known that temperature changes may occur in the surrounding waters. Accordingly, a fluid containing vessel 110 that has been towed in relatively cold waters for a length of time may obtain an increased density due to cooling effects from the surrounding water. When such a cooled vessel 110 reaches warmer waters, and particularly when there is an abrupt transition, the cooled vessel 110 may have a tendency to sink or reside lower in its surrounding water. To account for this, embodiments of the present invention comprise means for taking in additional air and increasing buoyancy. For example, ports 114 comprise manually activated or logic driven motors to adjust buoyancy while the device is in operation. A manually activated motor may be controlled from within a towing vessel or from another remote location and may allow a user to increase the volume of air contained within a vessel 110 based on the visual appearance of the vessel 110 or other indicia. Logic driven motors may be comprised of devices which sense one of: a difference between the temperate of water within the vessel 110 and the vessel 110 itself, a sudden change in the temperature of the water within which the device is being towed, or the amount of submersion of the vessel 110 within its surroundings. For example, a sensor may be employed at a certain location of the vessel 110 which senses the presence of an unacceptably high level of submersion and triggers motor(s) within one or more ports 114 to intake air and thereby increase the buoyancy of the vessel 110.

It will be recognized that it is often desirable to prevent materials, such as rain, sea water, and other contaminants from entering the ports 114 and thus impacting the purity of water or fluids to be transported. Accordingly, the present invention contemplates means to secure the ports 114 when venting or adding fluid or gas is not desired. For example, covers suitable for preventing the unwanted entrance of materials may be selectively actuated, such as by a remote user. Alternatively, ports 114 for venting air may be connected solely to a bladder which is not interconnected to a main fluid containing portion of the device 110. In one embodiment, physical barriers may be constructed around ports 114 which allow for the entrance and exhaust of gas, but prevent the unwanted entrance of various fluids.

In one embodiment, one or more one-way valves may be constructed on a portion of the vessel 110 that is to reside above the water line. One-way valves are known to those of skill in the art and may be provided to allow for the venting of gases, yet still prevent the unwanted entrance of other fluids or contaminants. For example, one one-way valve may be employed to allow for the release of air when less buoyancy is desired and another may be provided to allow for the opposite flow of air into a device 110 when greater buoyancy is desired. In one embodiment, one or more of these valves are selectively controlled by a user. In this manner, a user may have discretion as to when to insert air (i.e. a user may elect to insert air during optimal conditions when the risk of taking sea or rainwater is low) and/or remove air.

As shown, one or more fins or skegs 134 may be included on a vessel at a location below the water line 130 to increase directional stability of the vessel 10 while being towed. In one embodiment, one or more skegs 134 may be selectively controlled to assist in steering and/or maneuvering the potentially cumbersome vessel.

In one embodiment, the present invention comprises locating means. As will be recognized, submerged or partially submerged vessels may be difficult to identify, particularly in poor lighting conditions or at night. Additionally, it is a known risk that vessels 110 of the present invention and similar objects may become dislodged from their towing vessel. In such circumstances, these vessels may pose significant safety risks. While it is an aspect of the present invention that damage to or loss of devices of the present invention pose reduced risk to the environment, vessels separated from their host or towing vessel may still pose a collision risk. Accordingly, a transmitting device, such as a Global Positioning System ("GPS") transmitter is incorporated into one embodiment of the present invention. The GPS transmitter may, for example, transmit the coordinates of a vessel 110 at specified temporal increments or when another related device requests such information. Additionally, other vessels or remote locations may be equipped with GPS sensing means to detect and convey the transmitted location of a vessel 110.

FIG. 8 depicts a towed vessel for fluent cargo transport 110 equipped with a GPS transponder 138. In one embodiment, the GPS transponder 138 may be activated remotely, such as when a towing vessel recognizes that it has lost contact with the towed vessel 110. In another embodiment, the towed vessel 110 may constantly transmit information regarding its own coordinates. For example, the vessel 110 may transmit information regarding its location at predetermined time intervals whether or not it is detached from a towing vessel. In yet another embodiment, a vessel 110 may transmit information regarding its location upon request (i.e. at the receipt of a signal from another location or device). Information regarding a vessel's 110 position may be transmitted to and received by various different locations and objects. For example, the signal and information transmitted by a GPS transmitter 138 may be obtained by a remote computing station 142 for processing and displaying the information. A remote computing station 142 may reside in a variety of locations, including on other vessels and various fixed on-shore locations. Information transmitted by a GPS transmitter 138 may also be received by various other vessels 146 potentially in the vicinity of the towed (or misplaced) vessel 110. Vessels 146 may be equipped with indicator means 50 capable of alerting crew members that a partially submerged object 110 is present in their vicinity and may pose a safety risk.

Various other advantages of equipping a vessel 110 with GPS locating means will be recognized by those of skill in the art. For example, the status and progress of a fluid containing vessel 110 may be tracked remotely by interested parties to determine logistical information.

A vessel 110 may comprise visual indicia of its location and size, such as conventional lighting members positioned at various locations on the vessel 110. Additionally, given the significant width that floating vessels of the present invention may comprise, it is further contemplated that a vessel 110 may be equipped with port and starboard indicator lights to indicate the lateral boundaries of a vessel 110 (i.e. conventionally, green lights are used to indicate the starboard side and red lights to indicate the port side).

One of skill in the art will recognize that it may be desirable to transport a vessel 110 of the present invention in an emptied state, such as when a vessel 110 has been transported from a source to a delivery site and must thereafter be returned. In these circumstances, it is desirable to transport the vessel 110 in a manner requiring the least amount of storage space, weight and fuel costs. Accordingly, one embodiment of the present invention comprises the ability to at least partially deflate or extract a volume of air from a vessel 110 either during emptying operations or subsequent thereto. For example, vacuum powered means for emptying a vessel 110 may be attached to ports 114 to enable the extraction of an internal volume of fluid. Once all or most of an internal volume of fluid has been removed, the same or similar vacuum powered devices may be utilized to further extract a remaining internal volume of air from the vessel 110. It will be recognized that in such operations, measures may need to be taken to prevent a fully deflated vessel from sinking Accordingly, the device 110 may be tethered to various objects, such as a towing vessel or fixed on-shore objects via attachment means 118 or other similar structures on the device 110. Deflating a vessel 110 as described offers the benefits of reducing the overall weight and volume of a device 110 to be transported, as well as reducing the potential for mold and other contaminants to grow inside of an otherwise damp and dark internal volume.

Once deflated, a vessel 110 may be further compacted by folding or rolling the vessel 110 onto a storage drum or wheel. Devices for rolling a large vessel 110 onto a storage drum are described in, for example, U.S. Pat. No. 6,550,410 to Reimers, which is hereby incorporated by reference in its entirety.

As an alternative to deflation, it is contemplated that vessels of the present invention may be alternatively filled with an air or gas of a sufficiently lower density than water to provide adequate buoyancy. In this manner, vessels 110 may then be towed in an "empty" state with minimal drag and associated fuel consumption needed to return a vessel 110 to another location for further filling or recycling. For example, helium and/or ambient air may be inserted into an emptied vessel 110 to provide sufficient buoyancy and minimal drag upon the vessel when towed without fluent cargo.

Embodiments of the present invention may take the form or appearance of various objects which, for example, may hold commercial appeal or value. For example, at least a portion (e.g. a non-submerged portion) of towed vessels 110 of the present invention may comprise specific shapes or form specific characters for the purpose of displaying an image or a message. Images contemplated by the present invention include, but are not limited to, those with commercial appeal, such as trademarked or otherwise recognizable images or slogans which can be viewed by individuals including cruise passengers, airline passengers, and extraterrestrial image sensors (e.g. satellite photography).

It is further contemplated to provide vessels 110 of the present invention with the ability to selectively or temporarily display various images or messages. For example, portions of a vessel 110 which are inflated may be selectively inflated or positioned to display various images or text. In this manner, customizable messages may be displayed to various viewers. Alternatively, a portion of a vessel 110 of the present invention may include the ability to display written or marked images. For example, various inks, dyes, and similar materials may be placed upon a visible portion of the present invention. Such materials may be used to display, for example, the name of a company transporting contents, a third-party advertiser, or personal messages (e.g. a marriage proposal).

In one embodiment, the present invention contemplates preserving the integrity and purity of fluids to be contained within a vessel 110 by incorporating various features and materials of the fluids original natural surroundings. For example, embodiments of the present invention may be utilized in transporting water from remote and pristine regions of the Earth. In such applications, various natural features of these regions, such as natural soils and clays, may be incorporated into in the towed vessel 110. U.S. Provisional Patent Application 61/251912 to Szydlowski, which is hereby incorporated by reference in its entirety, discloses various benefits of naturally occurring soils when used for water filtration purposes.

Figure 9:
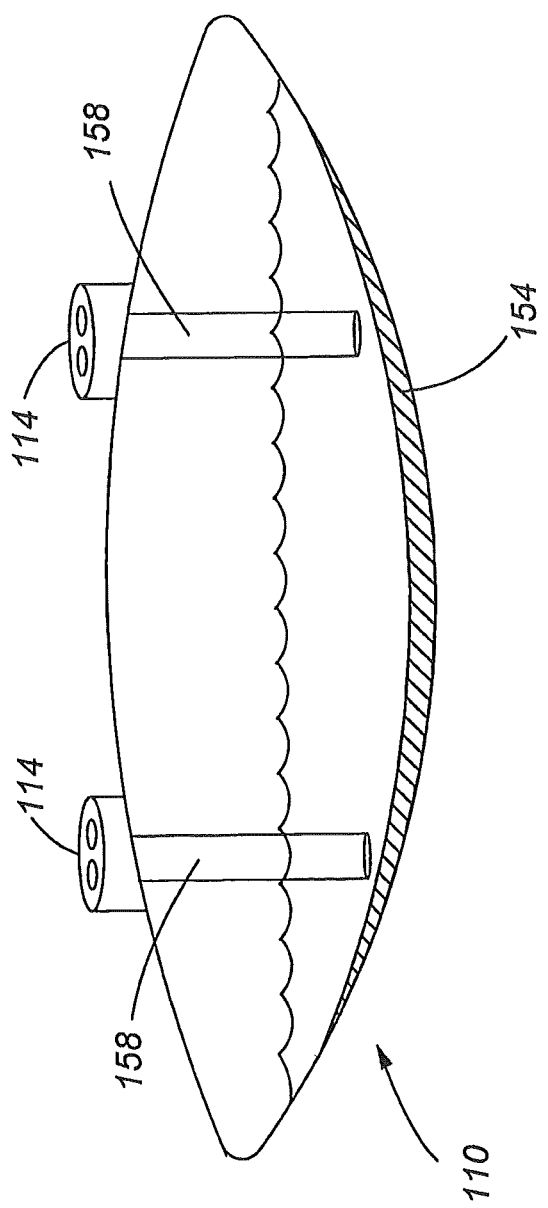
FIG. 9 is a cross-sectional side elevation view of a towed vessel suitable for transporting liquids according to one embodiment.

In applications where water to be transported is desired for its natural characteristics, including purity, mineral content, and other attributes, it is often desirable to maintain those characteristics throughout filling, transporting, and emptying a vessel 110. Accordingly, the present invention contemplates various means to preserve purity of a transported fluid, particularly when polyurethane, polyethylene, and other materials are employed as the structure of a vessel 110. As shown in FIG. 9, natural sediment 154 may be deposited within a towed vessel 110 which may act to isolate vessel contents from an inner surface of the vessel 110 as well as provide for filtration of the vessel contents upon entrance or exit from the vessel 110. Natural sediment 154 may be comprised of a variety of known soils, preferably those indigenous to the source of the water or fluid to be transported. For example, native clay minerals may be disposed within a vessel 110 to serve this function. Those of skill in the art will recognize the benefits offered by clay, including, but not limited to, its ability to isolate fluids from a vessel's inner surface and its effectiveness in filtration.

In addition to acting as an isolating barrier between fluid to be transported and at least a portion of vessel's inner surface, the sediment 154 may also be useful in filtering fluids contained within the vessel 110. For example, where emptying of the vessel 110 is accomplish by connecting vacuum powered means to ports 114, sediment 154 may be allowed to be drawn toward the ports 114. In one embodiment, this may be accomplished through the use of one or more flexible tubes or conduits 158. Upon reaching the ports 114, the sediment may be allowed to be trapped by any number of known filter devices. Such filter devices may include, for example, various mesh screens which may trap sediment particles and create a sedimentary filtration mechanism at an outlet 114 of the vessel 110.

In addition to or in lieu of depositing a layer of sediment within a vessel 110, the interior surface area of a vessel 110 may be coated with a substance known to preserve the integrity and purity of fluid to be transported. Various coating methods and substances are known and described in, for example, U.S. Pat. No. 6,808,808 to Freeman et al., which is hereby incorporated by reference in its entirety.

In various embodiments of the present invention, coatings are utilized on a bottom portion of a vessel 110. For example, where vessels are required to be towed into shallow water ports, a risk of puncture or tear to the bottom of the device 110 may be present. Accordingly, an abrasion and tear resistant material comprises at least a lower portion of the vessel 110. For example, various different Teflon fabrics may comprise or be added to a bottom portion of a vessel 110 to avoid unwanted tearing.

Figure 10:
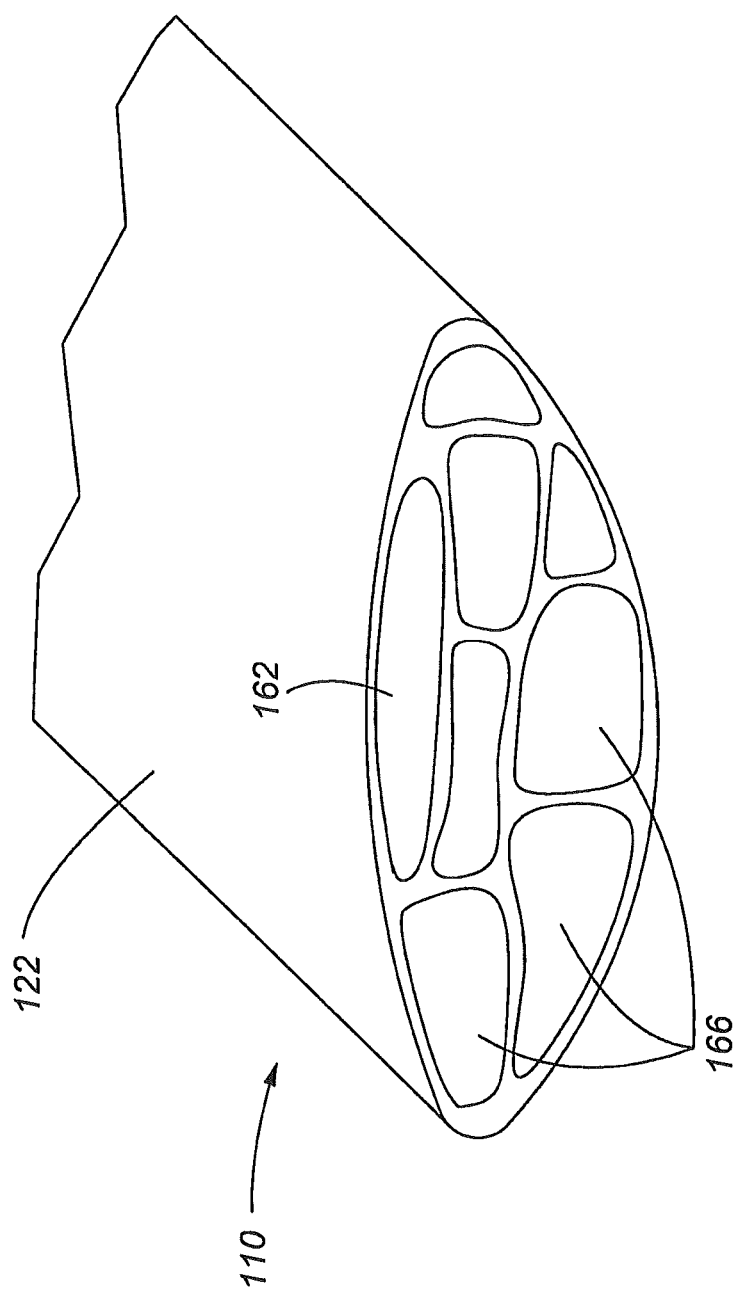
FIG. 10 is a cross-sectional perspective view of a towed vessel suitable for transporting liquids according to one embodiment.

FIG. 10 is a cross-sectional perspective view depicting one embodiment where a towed vessel 110 is comprised of various different internal compartments. Embodiments of the present invention may include, for example, a bladder 162 which may be used to provide buoyancy for the vessel 110 as well as assist in maintaining the vessel 110 in a substantially upright position. In addition to a bladder 162, embodiments of the present invention may further comprise various compartments 166 within a larger vessel body 122. Various sizes and shapes of additional compartments 166 may be useful, for example, where a variety of different fluids are to be transported and comingling of these fluids is undesirable. Embodiments of the present invention comprising multiple internal compartments 166 allow for the simultaneous transport of, for example, fresh water, juice, wine, and a variety of other fluids. To allow access to various different compartments 166, embodiments of the present invention provide for a variety of ports 114 which allow for exclusive access to specific compartments 166. Ports 114 may be connected to compartments 166 through previously described flexible tubes or conduits. Embodiments of the present invention further contemplate marking systems to identify which ports 114 are associated with compartments 166. For example, where cross-contamination of ports 114, associated tubes or conduits 158, and compartments 166 is undesired (i.e. where one or more port 114, conduit 158, and compartment 166 should be used only for a single type of fluent cargo), marking means such as text and color indicators are provided on a portion of the port 114 or vessel structure 122 to indicate to a user which materials should or should not be associated with a port 114. Those of skill in the art will recognize that the present invention is not limited to any number, sizes, or types of internal compartments 166. Indeed, the present invention contemplates the use of a single internal volume within a towed vessel as well as numerous compartments 166. In one embodiment of the present invention, a towed vessel further comprises mooring devices or means for attaching to mooring devices. For example, a towed vessel 110 includes fasteners, rigid members, and/or connecting devices to allow for a towed vessel 110 to be moored. Devices, and rigid members which may be connected to various portions of a mooring device include those disclosed in U.S. Patent Application Publication No. 2004/0157513 to Dyhrberg and U.S. Pat. No. 4,627,375 to Davis et al., which are hereby incorporated by reference in their entireties, and other similar known mooring devices. Including mooring devices as part of a towed vessel 10 or, alternatively, providing means to attach a towed vessel 110 to various mooring devices allows for the ability to fill or empty devices of the present invention in a number of locations or orientations, store the device 110 in a docked or off-shore location, and generally stabilize the structure 110 when transport is not desired.

Figure 11:
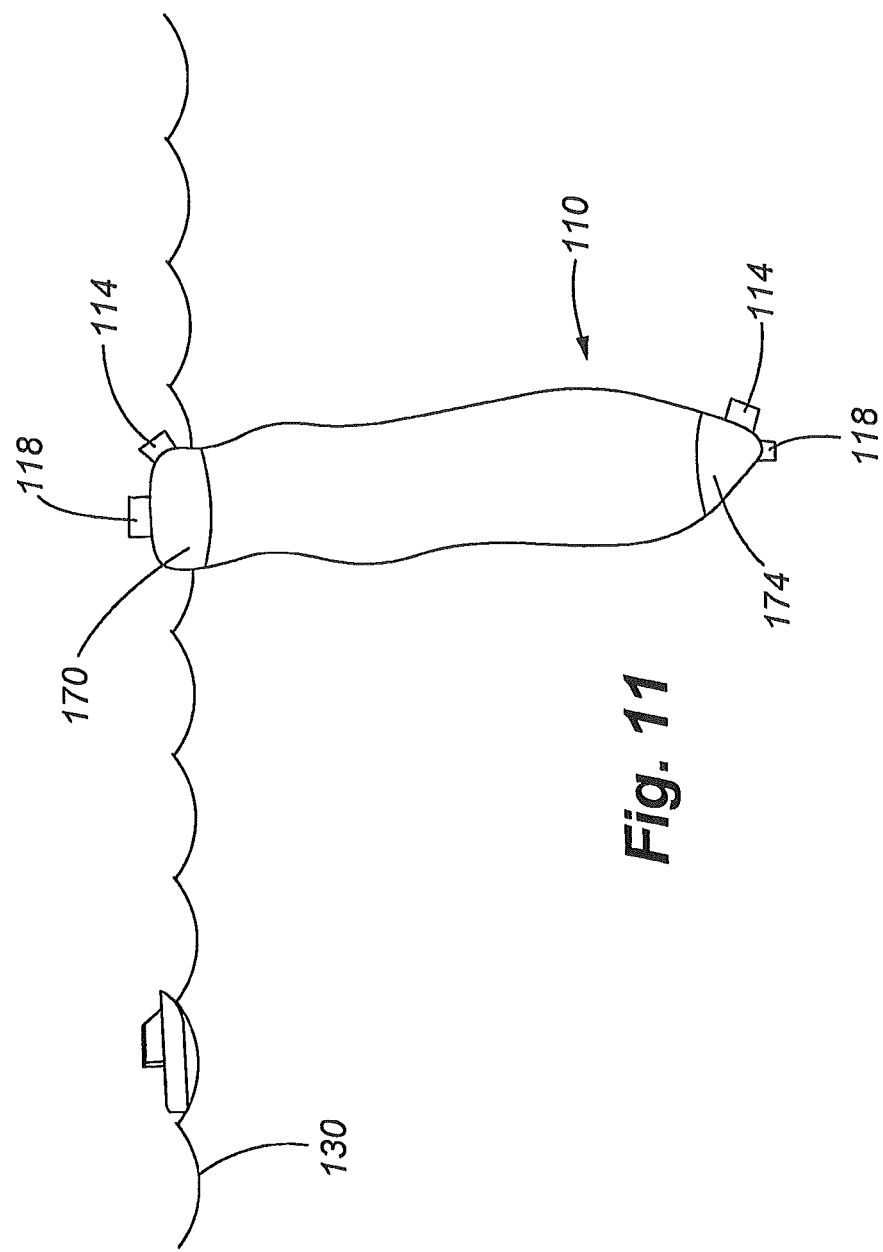
FIG. 11 is a side elevation view of a towed vessel suitable for transporting liquids according to one embodiment.

Referring now to FIG. 11, one embodiment of the present invention is shown for storing a towed vessel 110 in a marine environment in a substantially vertical position with respect to a water line 130. In one embodiment, the present invention is capable of carrying up to 1,000,000 $m^3$ of bulk water. Accordingly, those of skill in the art will recognize that such an object, particularly when oriented in a generally horizontal position, will occupy a significant surface area. Therefore, one embodiment of the present invention contemplates devices and methods for storing a towed vessel 110 in a generally vertical position with respect to a water line 130. A first portion 170 of a towed device is inflated or similarly experiences an increase in buoyancy while an additional portion 174, preferably disposed at the distal longitudinal end, is filled with water or similarly experiences a decrease in buoyancy/density. In this manner, the device 110 may be allowed to float on-end and occupy substantially less volume than it would if docked or allowed to remain horizontal. In one embodiment, the contents and associated buoyancy of compartments 170, 174 are varied and/or controlled by one or more one-way or two-way valves 114. For example, compartment 174 may be filled with water via the control of valve 114. The volume of water taken in by valve 114 is then allowed to cool due to its position in a deeper portion of a body of water which is known to generally be colder than areas disposed closer to the surface 130. In one embodiment, valve 114 comprises a two-way valve capable of dispelling water from a compartment 174 and facilitating the repositioning of the device 110 to a surfaced position.

In an alternative embodiment, a towed vessel 110 may be stored in a generally vertical position either when it is an emptied or full state. Such a device is capable of being attached to various fixed and/or floating objects (e.g. mooring devices) via reinforcing member 118, while a distal end of the device 110 is allowed to sink. In one embodiment, the distal end is allowed to sink by decreasing the buoyancy of a portion 174 of the vessel through the addition of water, sand, ballast, etc., which is further capable of being expelled from the device via two-way valve 114 in order to restore the vessel 110 to a generally horizontal position.

Figure 12:
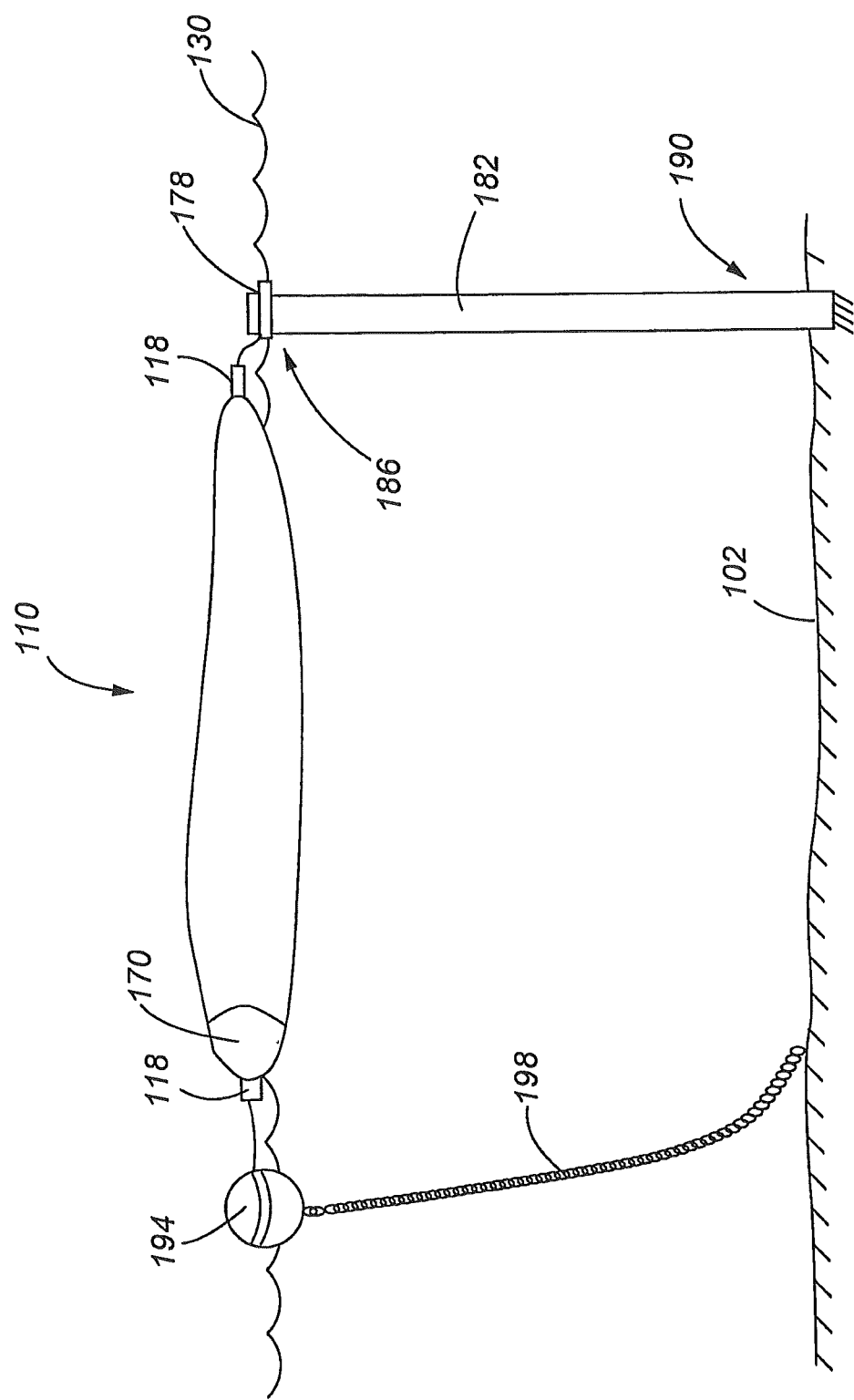
FIG. 12 is a side elevation view of the present invention according to one embodiment.
Figure 13:
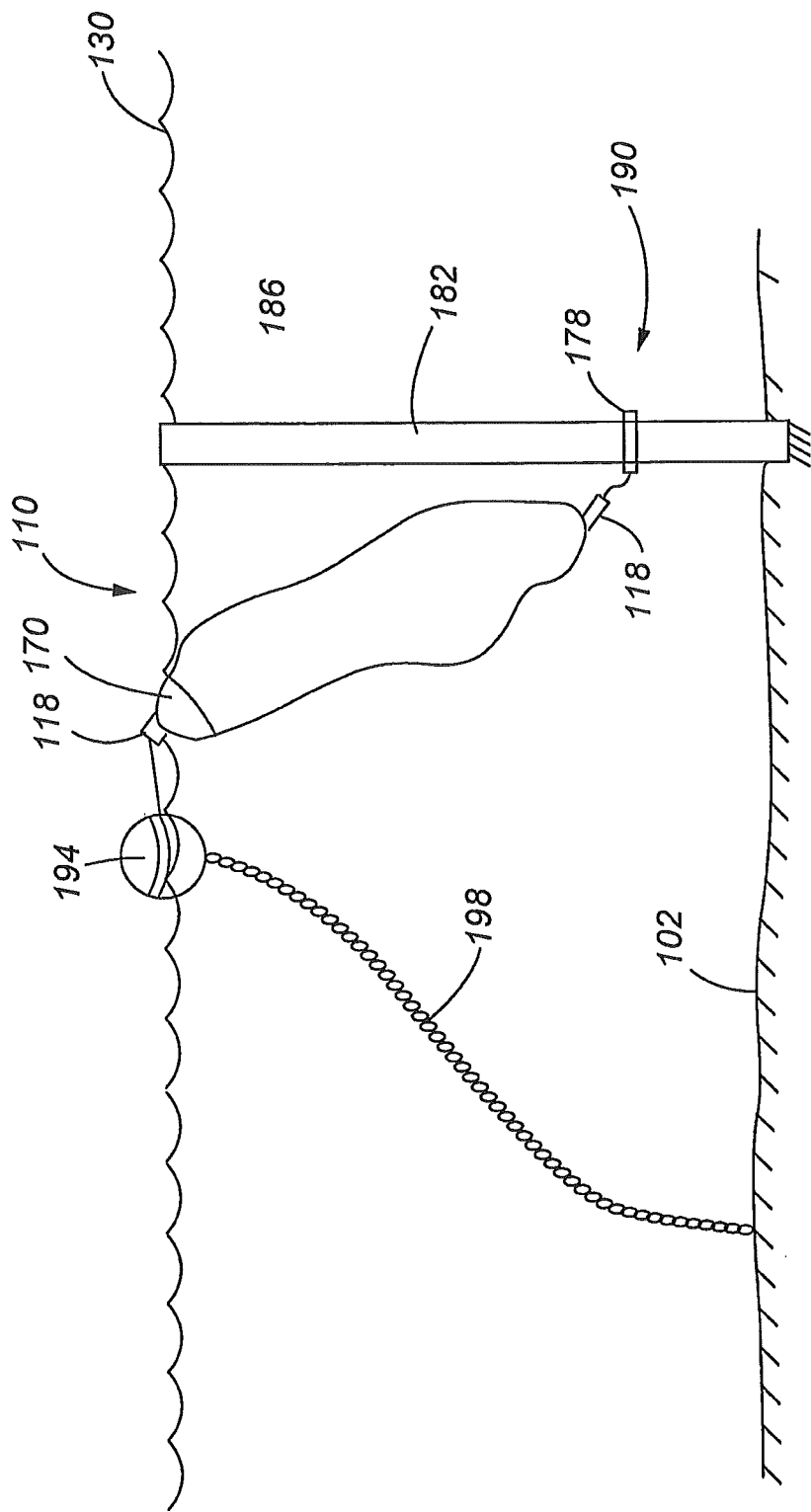
FIG. 13 is a side elevation view of the present invention according to one embodiment.

Referring now to FIGS. 12-13, a towed vessel 110 and associated storage means are depicted. When a vessel 110 is to be stored, a reinforcing member 118 may be attached to a securing device, such as a mooring buoy 194 and associated anchor line/chain 198 which may be securely fixed to a floor 102 of a marine environment. Additionally, a second end may be secured to a translatable device 178 positioned on a fixed member 182. Thus, in one embodiment, the vessel 110 resides at the surface 130 of a body of water in a substantially immobile position when the translatable device 178 is located at or near a surface position 186. Towed vessels 110 of the present invention may be selectively positioned in a substantially vertical position by translating the translatable device 178 along a vertical length of the fixed member 182 so that the translatable device 178 and second end of the vessel 110 is disposed in a submerged position 190. One of skill in the art will recognize that mooring devices 194, 198 of the present invention, although generally fixed, may be free to translate within a given radius. Thus, when one end of a vessel 110 is submerged, an end attached to a mooring buoy 194 may reposition itself to a location proximal to the fixed member 182, thus allowing the vessel 110 to reside in a substantially vertical position for storage. The vertical positioning of vessels 110 of the present invention may be facilitated by the inclusion of a portion 170 of the vessel 110 which retains a sufficient amount of buoyancy so as to prevent the entire vessel 110 from sinking Alternatively, mooring buoys 194 of the present invention may comprise sufficient buoyancy to support a load applied by a partially submerged vessel 110.

Vertical positioning devices 182 of the present invention may comprise various known devices useful in the linear translation of objects. For example, worm gears adapted for use in translating associated nuts, pulley systems, hydraulic jack or elevator devices, rail actuators, and various other known devices useful for translating a device 178 between a raised 186 and lowered 190 position may be incorporated into embodiments of the present invention.

It will be recognized that various different liquids and gases may be contained and transported within embodiments of the present invention. Accordingly the present invention is not limited to the transport of water, wine, or human potable substances.

In various embodiments, the present invention generally relates to systems and methods for distributing water. More specifically, the present invention is based on the realization by the inventors that water derived from inland ice, and methods of trading such water, provide benefits not obtainable from present water sources of trading methods. In particular, the present invention provides an on-demand method for obtaining water having characteristics desirable to a specific customer.

Figure 14:
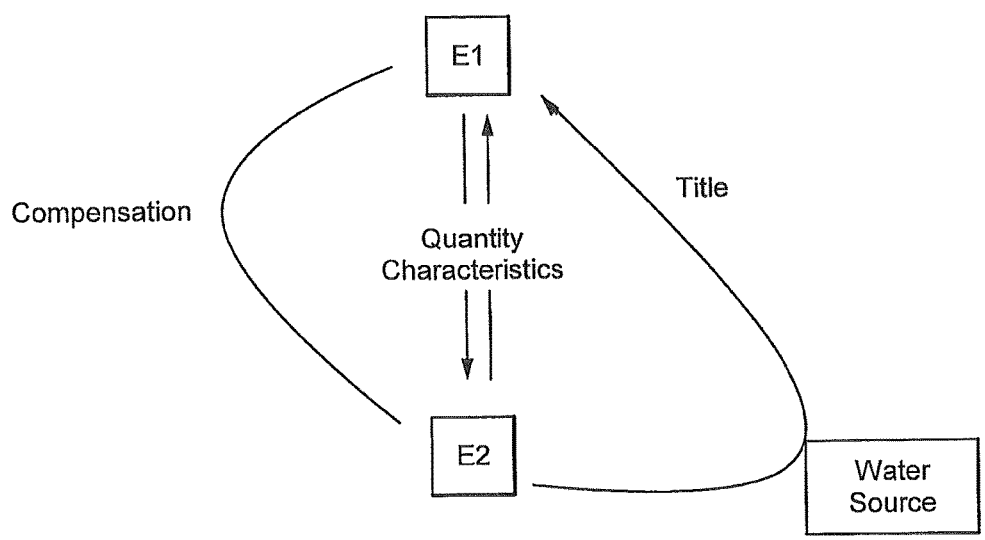
FIG. 14 is a process diagram of the present invention according to one embodiment.
Figure 15:
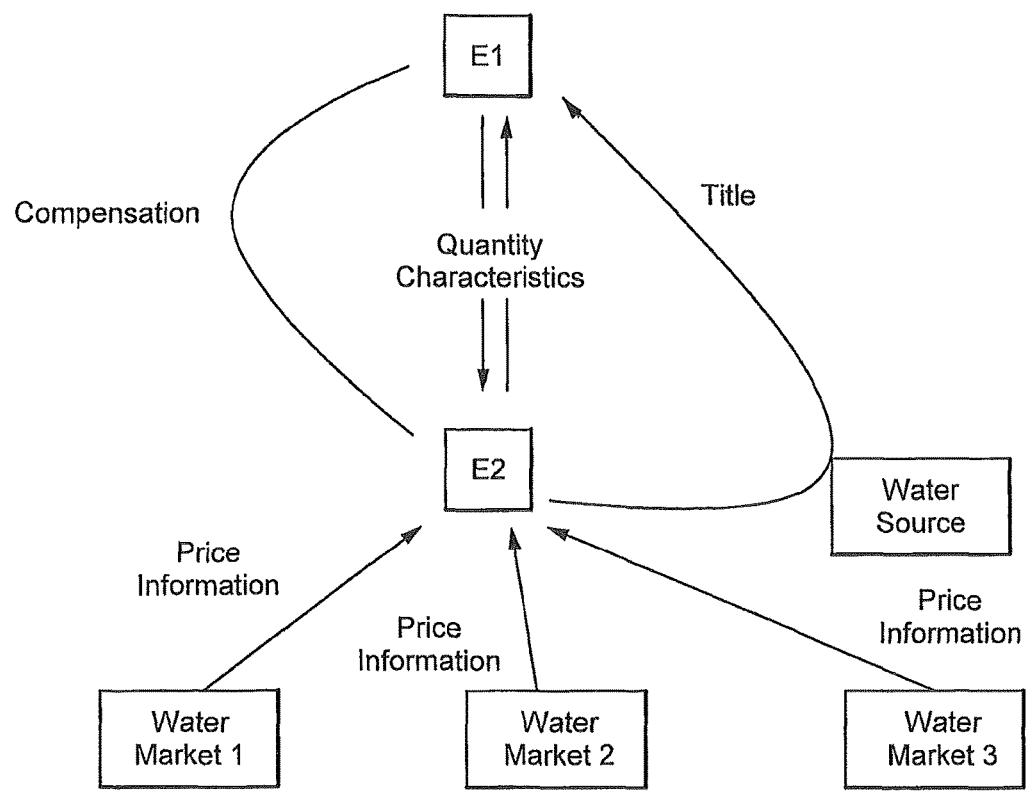
FIG. 15 is a process diagram of the present invention according to one embodiment.

One method of the present invention is illustrated in FIG. 14. The illustrated method can generally be practiced by:

(a) connecting a first entity (E1) desiring to obtain water having at least one specific characteristic with a second entity (E2) having possession of a source of water comprising the at least one specific characteristic;

(b) conveying from the first entity to the second entity information relating to the quantity and characteristic of the desired water;

(c) based on the information conveyed, transferring title to a quantity of water having the desired specific characteristic that the second entity is willing to transfer, from the second entity to the first entity, wherein the second entity receives compensation in an amount related to the quantity of water covered by the transferred title.

According to the present invention, the entities involved in the claimed method can be individuals or groups of individuals such as corporations, partnerships, agencies, non-profit agencies, and the like, or combinations thereof. Moreover it should be noted that the composition of one entity of the claimed method is independent of the composition of the other entity. That is, for example, the first entity may be an individual while the second entity may be a company. Any such combination is contemplated. It is also contemplated that the role performed by the two entities of the claimed be conducted by the same entity, as certain advantages of such an arrangement could result.

As used herein, the terms connecting, connect, linking, link, and the like mean that the two entities interact in such a way as to allow a two-way transfer of information. Any means of connection that allows communication between the entities can be used to practice the present invention. In one embodiment, the connection is formed using an electronic device. Any electronic device is suitable so long as it allows communication between the entities. Examples of useful electronic devices include, but are not limited to, data transmission devices, telephones, cellular phones, facsimile machines, and computers.

In one embodiment of the present invention, the two entities connect through an exchange. As used herein, an exchange is a collective, institution, organization, or association which hosts a market where stocks, bonds, options and futures, commodities, and the like, are traded. Buyers and sellers come together in the exchange to trade. In the present invention, an exchange is envisioned as trading water or rights therein, although the trade of other stocks, bonds, options and futures, commodities and the like, may also occur within the same exchange. Such an exchange can be located at one or more physical locations that may or may not be connected by means of communication, such as telephone or data transmission lines. In addition, such exchanges can lack a physical location, such as a building, and exist solely on a network such as a computer network. It should also be understood that an exchange may refer to an existing exchange (e.g., The New York Stock Exchange, The Chicago Mercantile Exchange, etc.), or it may refer to an entirely new exchange.

With regard to the present invention, water refers to water having one or more characteristic that renders it desirable to a consuming population. In one embodiment, the characteristic possessed by the water has high degree of purity. A high degree of purity refers to water that is substantially free of harmful contaminants. A contaminant is any substance in the water deemed undesirable by the purchaser of the water. Examples of contaminants include, but are not limited to, heavy metals, including transition metals, metalloids, lanthanoids, and actinides (e.g. Mercury, Lead, Chromium, etc.), uranium, arsenic, chlorine, trihalomethanes (THM's), uranium, PCBs (polychlorinated biphenyls), nitrate, nitrite, pesticides, herbicides, volatile organic compounds, carbon emissions from coal and petroleum fired power plants, and harmful microorganisms such as coliform bacteria, giardia, and cryptosporidium. While it will be recognized that certain contaminants may be more or less harmful to different individuals, substantially free of harmful contaminants means that the source contains such a low level of contaminants as to not cause illness or harm to an adult human when up to 64 fluid ounces are consumed on a daily basis. Methods of determining and quantifying purity are known in the art. For example, contaminants can be measured in parts per million (ppm). In one embodiment, contaminants are present in the water at a level of no more than 1000 ppm, 500 ppm, 250 ppm, 100 ppm, 75 ppm, 50 ppm, 25 ppm, 10 ppm, 5 ppm, 2.5 ppm, or 1 ppm. Such levels can also be expressed in terms of percentages. For example, 1 ppm is equal to 0.0001% on a volume per volume or weight per volume basis. In one embodiment, contaminants are present in the water at a level of no more than 0.1%, 0.05%, 0.025%, 0.01%, 0.0075%, 0.005%, 0.0025%, 0.001%, 0.0005%, 0.00025%, or 0.0001%. Methods of measuring such levels of contamination are known to those skilled in the art.

In one embodiment of the present invention, the high level of purity is the result of natural processes such as, for example, filtration through soil. By selecting a water source of sufficient initial purity, natural and organic filtering can be applied to produce high quality potable water without the use of sterilization chemicals or energy intensive filtration means. It is known that soil acts as a natural filter of water. In addition to the mechanical capturing of solid particles, the term filtering in this context also involves retaining chemicals, transforming chemicals, and restricting the movement of certain substances. These acts of filtering are often known as soil attenuation. Soil attenuation includes the ability to immobilize metals and remove bacteria that may be carried into the water through such means as human or mammalian waste. It is further known that fine textured soils, such as clay, provide superior filtration of water when compared to large grained or coarse soils such as sand. Water travels through coarse soils more rapidly, thereby reducing contact between the water and soil and thus reducing filtration or attenuation. Permeability is a typical measure of a soil's ability to transmit water and other fluids. Clay is known to have a relatively low permeability as a result of its small grain size and large surface area, causing increased friction between water transmitting through the clay. Clay may have a permeability, or hydraulic conductivity, as low as $10^{-9}$ centimeters per second whereas well sorted sands and gravels typically have a permeability of $10^{-3}$ to 1 centimeter per second.

In one embodiment, the characteristic possessed by the water is that it is from a specified time period. The ability to trade water from previously frozen ice that is over hundreds, if not thousands, if not millions of years old, by its nature constitutes a new process and product. Furthermore the ability to date these layers of frozen ice and generally correspond it to a given time era is advantageous in that different properties of water corresponding to different layers may exist. Such properties can be used as the basis for satisfying different consumer markets. While it is acknowledged that ice has been melted to derive water in the past, it has not been accomplished under conditions that preserve the pristine aspects of such water and categorize those aspects according to their date. While the present invention is not limited to any particular region, ice caps and glacial ice south of 15 degrees latitude are well suited for the claimed method.

In accordance with embodiments of the present invention, the ice from a glacier and/or ice sheet can be cut, drilled, and/or divided into various segments. The cutting, drilling, and/or division of the segments can separate the ice into either vertically or horizontally separated segments. The segments can then be further divided by date into other segments. These dated segments are then processed under strict hygienic conditions such that the properties of the water are maintained and not polluted. In a preferred embodiment, the processing of the ice is performed under an increased atmospheric pressure and where staff must be present during the operations. The staff should wear special clothing adapted to the purpose of maintaining the hygienic properties of the water. Preferably the cutting, drilling, and/or tapping and subsequent packaging of the ice are performed in accordance with FDA current good manufacturing practice for processing and bottling of bottled drinking water, 21 CFR 129.

The ice can be drilled from the top or may be extracted from the terminus of the glacier such that the layers are taken out directly without an intermediate step as required by the vertical recovery of the ice. Furthermore, various layers of the ice can be tapped and pumped in an effort to recover the water contained therein. It is one aspect of the present invention to provide a method of processing ice from a glacier or ice sheet. The ice is extracted from the reservoir, i.e., glacier or ice sheet. The ice is then segmented and categorized by date. Thereafter, each segmented section of ice is processed separately under hygienic conditions such that the pristine aspects of the water are maintained. The water is then packaged separately and labeled according to the date from which the ice existed. For example, renaissance water that came from the early 1400 AD era is bottled separate from water that existed at the time of Christ or around 0 BC. The water may be portioned into any desired amounts (e.g., consumable units, bulk quantities, etc.). Consumable units are generally portion sizes acquired by an individual consumer. In one embodiment, the water is portioned into about one-half liter to one liter volumes, due to the categorization of the ice and subsequent processing of the ice into water comprising different properties from one batch to the next. Such water can then be traded based on the uniqueness of its properties. The inventive process merits a higher selling price of water than simply cutting up ice from a glacier and melting it. Consumers may be willing to pay a premium for water that traces its roots back to the same time that Leonardo da Vinci lived, for example. Therefore, reasonable sizing of the sellable units would be desired based on the attractiveness of the process provided by the present invention.

Alternatively, water from a particular era or containing certain properties could be sold in bulk quantities. Particularly, breweries or distilleries that have a long historic tradition could purchase large batches of dated water. They could then use water that dates back to their original product in order to recreate the original beverage that they used to produce. Many breweries and the like pride themselves on not changing certain recipes over the course of many years. Some breweries and distilleries have been creating the same product for over a hundred years. These companies would be able to purchase water that existed during the days of their founders and could create, market, and sell the "original" product to consumers with literally no changes from the true original. Consumers would be willing to pay a premium for a truly original pint of Guinness® or a bottle of Lagavulin scotch made from water dating back to 1816.

Another aspect of the present invention provides a system for categorizing, extracting, processing and packaging water into different historically categorized groups. In accordance with one embodiment, a recovery station is set on or near an ice source (e.g., glacier, ice sheet, ice cap, and the like). Also included is a recovery member that is operable to transmit ice from the ice source to the recovery station. In the recovery station, the ice can then be separated and categorized according to date and processed according to the methods described above.

A further aspect of the present invention provides a method for producing bottled water from glacial ice having a predetermined age. The method includes analyzing the age of a number of layers of glacial ice within an ice source. Then a first layer, whose age is known, is extracted in either a solid or liquid state. The first layer is extracted such that other layers remain substantially undisturbed. This allows the first layer to be substantially separated from the other layers of glacial ice, thereby isolating the characteristics of the water within the first layer. After the water has been extracted it is collected and directed into a container (e.g., a bottle, bag, or the like.) Once the water from the first layer has been effectively bottled or contained, an indication in the form of a tag or label is place on or around the bottle/container to reflect the characteristics of the water that is within the bottle/container.

Still a further aspect of the present invention provides for a way of recovering and preparing dated water in an economically viable fashion. In one embodiment, a number of containers are separated and filled with water (either from the ice source itself or from another source) in a frozen or liquid state. Water from various segments of the ice source are then extracted from the ice source and then placed into different containers. Essentially, a majority of the water in each container does not need to be extracted according to the costly process described herein. However, a non-trivial amount of categorized water is also in each container such that consumers can be assured that the water they are drinking is at least partially derived from a particular time period and thus has the unique characteristics of water from that time period. The primary water that is used (i.e., the non-categorized water) should be held to the highest purity standards so that when the categorized water is added, the unique characteristics of that water are not lost or disrupted.

In one embodiment of the present invention, the characteristic possessed by the water is the presence of extraterrestrial-derived components. Such components include, but are not limited to, molecules such as amino acids and other organic molecule, that are derived from comets, asteroids, and the like. One example of such a component is glycine, a basic component of proteins. While the details of the potential health benefits of such components have yet to be evaluated, there exists a viable market for unadulterated drinking water which could reasonably be calculated to contain glycine and primordial building blocks of life. In addition to the commercially appealing aspects of consuming the origins of life itself, glycine is known to produce a sweet taste for humans.

In one embodiment of the present invention, the water is sequestered in a form suitable for long term storage that does not affect the unique characteristics of the water. In one embodiment, the water is sequestered as ice. In a particular embodiment, the water is sequestered as glacial ice. In yet another embodiment, the water is sequestered in a polar ice cap. Various combinations of such sequestration means are also included in the present invention.

In one aspect of the present invention, information regarding, at least, the desired quantity and characteristic of the water being traded, is conveyed between the two entities. Such conveyance refers to the transfer of information using means disclosed herein. The conveyance of such information can also be referred to, for example, as an order or a purchase order. Such orders will contain, at least, the quantity of water desired by the buyer, or the characteristic desired by the buyer. With regard to quantity, also referred to as a tradable unit, the water can be portioned into any suitable volume. For example, the water may be portioned into the previously mentioned consumable units, or it may be traded in bulk quantities. Examples of useful tradable units included, but are not limited to, about 1 liter units, about 5 liter units, about 10 liter units, about 50 liter units, about 100 liter units, about 500 liter units, about 1000 liter units, about 5000 liter units, about 10,000 liter units, about 50,000 liter units, about 100,000 liter units, 500,000 liter units or 1,000,000 liter units. Larger volumes are also envisioned. It should also be appreciated that tradable units can be in volumes using other systems of measurement. For example, such volumes can be measured in gallons, tons, or metric tons.

Orders can also contain information about the characteristic of the water desired by the buyer. Such characteristics have been disclosed herein. However, it should be appreciated that the water being traded can have more than one of the disclosed characteristics. Furthermore, in addition to the characteristics disclosed herein, the water can have other characteristics not mentioned herein. It will be understood by those in the field that orders can contain information relating to topics other than quantity and characteristics of the water being traded. For example, an order may contain information relating to the date of transfer of title of the water, the date of transfer of physical possession of the water, the location of shipment, compensation to be received by the second entity, etc.

It should also be understood that conveyance of information between the two entities may involve back and forth information exchange before the entities reach an agreement on the quantity and/or characteristic of the water being traded. Such back and forth information exchange may be needed simply for clarification of terms, conditions, and the like, or it may involve haggling, negotiating, discussion, and the like.

Once the entities have agreed on the specifics of the trade (e.g., quantity, characteristics, etc.), title to a volume of water having the characteristics recited in the order is transferred to the buyer. Such transfer can involve physical or electronic recordation and/or transfer of title documents. Title is used under its commonly understood legal meaning, as are ownership and possession. That is, title refers to the sum total of legally recognized rights to the possession and ownership of property (e.g., water) that can be secured and enjoyed under the law. It should be understood that title can, but does not necessarily imply, rights in ownership or possession. The determination of such rights can be part of the information exchanged between the entities.

Once title has been transferred, the buyer may or may not take physical possession of the water. Physical transfer of the water can occur immediately, at a later time, or it may never occur. It is one aspect of the present invention that transfer of the title to the buyer does not necessarily indicate the buyer is the final consumer. Instead, title in the water can give the buyer the right to further transfer the title to another entity. In this aspect, transfer of the title to the buyer can be viewed as an option to take possession of the water.

As previously described, prior to trading, the water can be sequestered, for example as ice. This aspect of the present invention is very beneficial in that the water can be kept sequestered until such time as the buyer, or other party to whom title has been transferred, requests possession of the water. Thus, if the buyer takes title but decides to delay possession, the water can remain sequestered until the buyer, or other party holding title, requests possession. Alternatively, the buyer may request possession upon transfer of title, with the understanding of the practical, physical limitations involved. Nonetheless, once the entity holding title decides to take possession of the water, the seller can then go to the water source, remove the quantity of water being transferred to the title-holding entity, and transfer such volume thereto. In an embodiment where the water is sequestered as ice, the seller can remove sufficient ice, from a region of the glacier or ice cap comprising ice having the agreed upon characteristics, such that, upon melting the volume of water produced is at least the volume being transferred. This melted ice is then transferred to the title-holding entity.

In one embodiment, transfer of title also carries transfer of ownership of the water. Details regarding all rights transferred with the title can be determined during interaction of the buyer and seller.

It is an aspect of the claimed method that the seller receives compensation for transferring the water. Such compensation can be transferred to the seller at any time. In one embodiment, the seller receives the agreed upon compensation prior to transfer of title. In one embodiment, the seller receives the agreed upon compensation simultaneous with transfer of title. In another embodiment, the seller receives the agreed upon compensation after transfer of title. Compensation can be transferred directly from the buyer to the seller, or it can involve additional entities. For example, the seller may transfer title, ownership, and/or possession of water to the buyer, but receive compensation from a third entity not involved with title, possession or ownership of the water (e.g., a bank or parent corporation). Similarly, the amount of compensation can be decided upon between the seller, the buyer, additional entities, or combinations thereof. Further, decisions on the timing of compensation may or may not be part of the order.

Compensation to the seller is an amount agreed upon between the buyer and seller. However, various tools can be used to help determine such an amount. For example, since water in various forms is sold worldwide on a daily basis, a large volume of information exists regarding the price of water. Further, such data can be linked with other characteristics (metadata) (e.g., geographic region) allowing the sorting of the price of water by such characteristics such as, for example, geography, intended use, time or date of purchase., etc. Such data is very useful in determining compensation. Thus, in one embodiment of the present invention, compensation is determined using average price data for water obtained from current water markets. In using such data, the seller obtains the selling price of water from a variety of different markets. In a preferred embodiment, the seller uses metadata to obtain the selling price of for water having characteristics related in some meaningful way (e.g., intended use, geographic location of use) to at least one characteristic of the water being transferred.

Once the title-holding entity requests physical possession of the water, transport of the water can be made using any means suitable for transporting the water without affecting the quantity and/or characteristics thereof. Examples of water transport devices include, but are not limited to, trucks, planes, ships, pipes, aqueducts, and bags. A particular suitable transport device is a large water bag. Such bags are made of a suitable material, such as plastic, rubber, nylon, or combinations thereof, and can vary in size depending on the amount of water being transported. Such bags have the advantage of not altering the quantity or characteristic of the water contained therein. To transfer water using such devices, the bags are filled with the water to be transported, sealed and then transferred to the final destination. Any method of moving such bags can be employed. A particularly useful method is to tow such bags through the ocean using ships, barges, tankers, and the like. In one embodiment, unmanned, GPS-guided, boats tow the bags. Such a transport mechanism would reduce the cost associated with a crew.

In one embodiment of the present invention, the ice itself can be transported to an agreed upon location. In such embodiment, ice in the required volume and having the desired characteristics, would be removed from the glacier or ice cap, and transported directly to the agreed upon location. Transport of such ice could be achieved in several ways. For example, the ice could be allowed to melt during transport such that upon arrival, it is in a liquid form and ready for consumption. Alternatively, the ice could be kept frozen such that it arrives at its final destination in its original form. Such transportation can be achieved using technology known to those in the refrigeration arts.

In one embodiment of the present invention, the water is transported to a different geographical location than where it is sequestered, without affecting the characteristics of the water. In one embodiment, the water is transported at least 10 miles, at least 250 miles, at least 500 miles, at least 1000 miles, or at least 10,000 miles, from the location where it is sequestered. Such distances can also be measured using kilometers, nautical miles, and the like.

Figure 16:
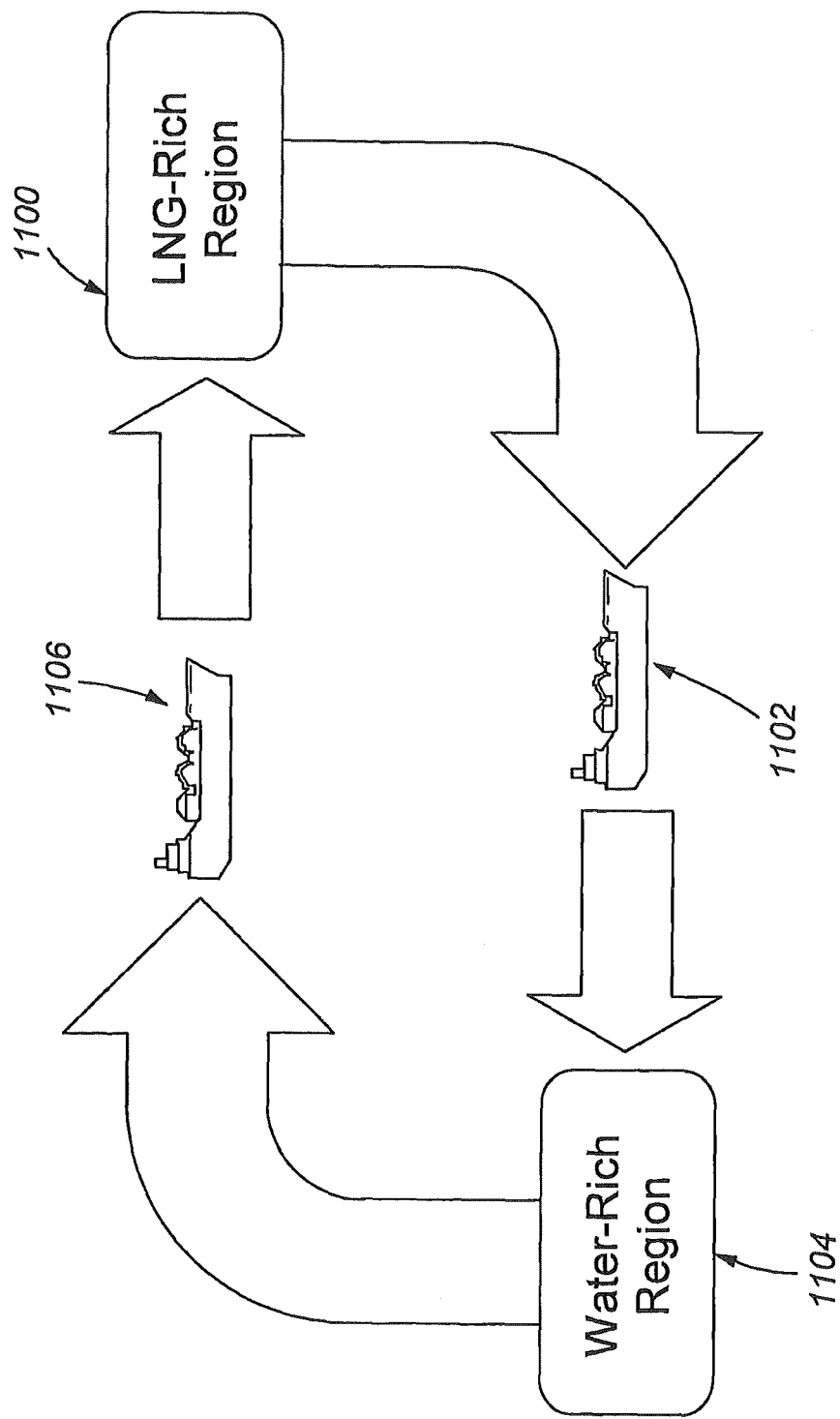
FIG. 16 is a process diagram of the present invention according to one embodiment.

FIG. 16 depicts one embodiment of the present invention wherein a LNG tanker 1102 is utilized to transport LNG from a country, region, or port 1100 rich in such resources to a region having a demand for LNG 1104. In one embodiment, the region having demand for LNG 1104 also comprises a supply of fresh water or similar liquid having value. In various embodiments, such a liquid is transported from the region 1104 back to the LNG origin 1100 or to various other destinations by utilizing features, volumes, and functionality in a vessel that previously conveyed water 1102 from the LNG-rich region 1100. Thus, in one embodiment, shipping vessels are utilized to convey two or more resources from one location 1100 to another 1104 in a generally cyclical manner, increasing efficiency of the overall transportation method.

One of ordinary skill in the art will recognize that water or similar liquids need not be conveyed directly back to a vessel's origin. Indeed, in various embodiments, a vessel 1102 used to convey LNG or similar product to a region 1104 may be supplied with a quantity of water or another cargo and thereafter transported to another destination (not shown). In various embodiments, the water-rich region 1104 is not the same region having a demand for LNG or similar products. Accordingly, LNG may be conveyed from a source or origin 1100 to a port or location in need of the same (not shown). The LNG tanker may then be routed to a water-rich region 1104 for acquisition of water or similar and directed to various locations in need of the same.

One of skill in the art will recognize that the regions of the world which are generally endowed with large LNG supplies have a similar dearth of water supplies. Accordingly, various embodiments of the present invention contemplate utilizing LNG shipping technology to provide water upon return voyage. However, as will be recognized, various trade routes, diversions, off-shoots, etc. are contemplated herein. According to various embodiments, water and LNG are transported to and from any number of ports or locations, with shipping efficiency provided by the ability to utilize existing tankers and/or equipment for a variety of different liquid cargoes.

Figure 17:
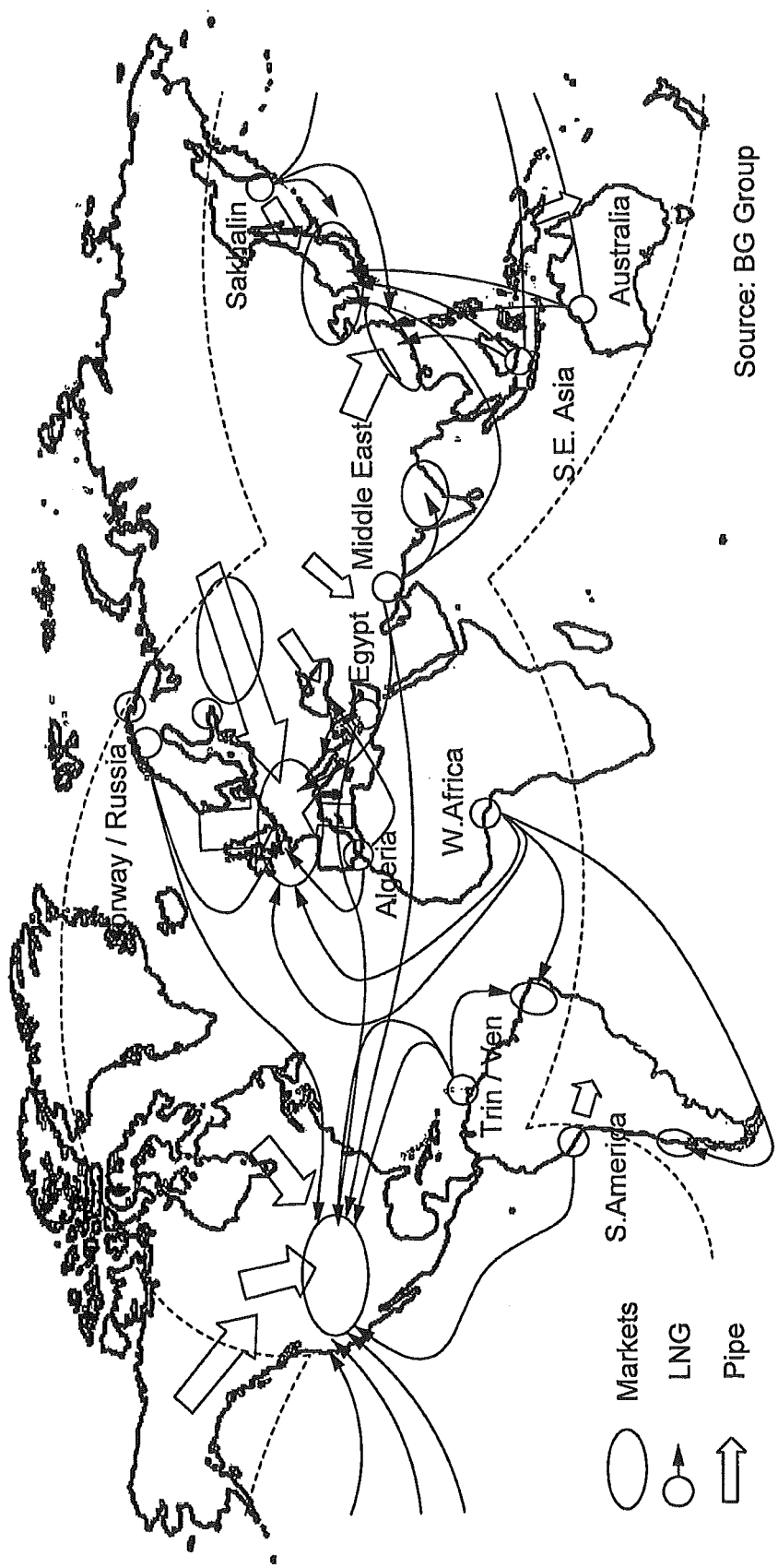
FIG. 17 is an illustration of various actual and potential routes as contemplated by the present invention.

FIG. 17 depicts various trade and supply routes of LNG. It will be recognized that a number of locations depicted have substantial need for water and will continue to experience such need as demand grows. Furthermore, many of these water-depleted regions currently export or have the potential to export LNG and other supplies via large tankers or ships. Given the finite number of LNG tankers and similar vessels in operation, these vessels will obviously need to return to a point of origin at some time in their career. Various embodiments contemplate returning these vessels with quantities of water suitable for drinking, agriculture, sanitation, and/or various other purposes. As used herein, the term "fresh" with respect to water need not necessarily mean potable. Rather, it will be recognized that "fresh" is merely a term for the alternative to salt water.

Figure 18:
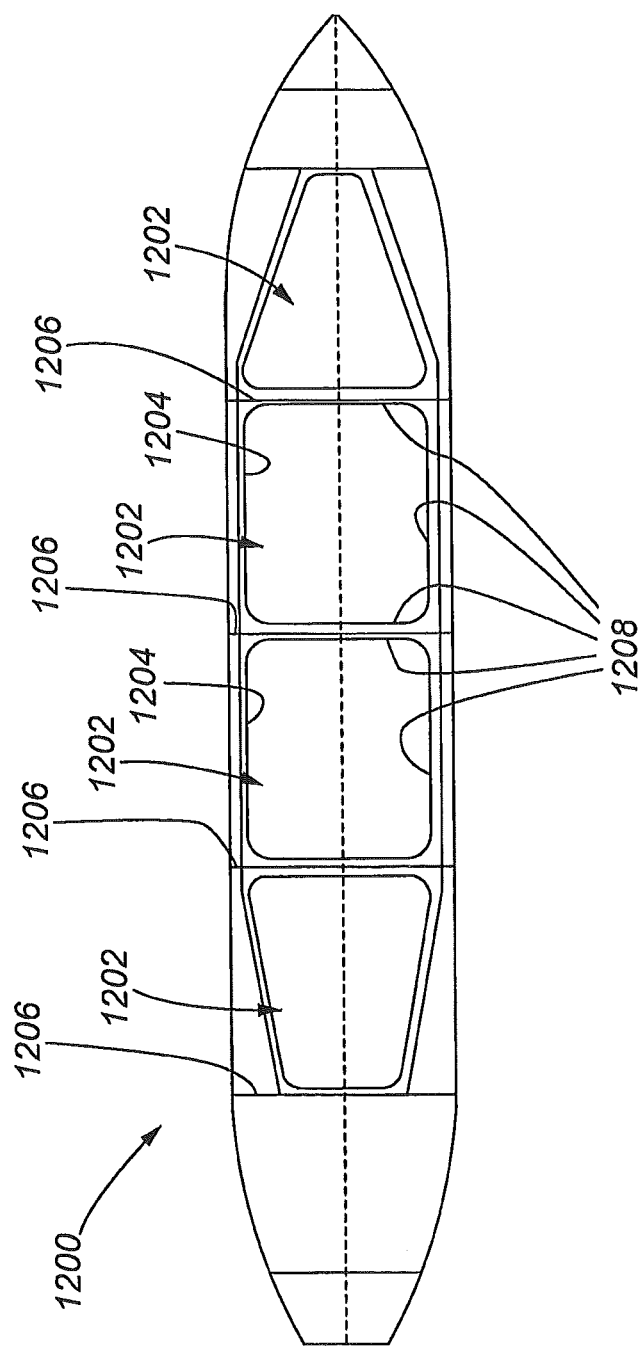
FIG. 18 is a top plan view of one embodiment of the present invention.

FIG. 18 is a top plan view of a shipping container 1200 with one or more internal storage volumes 1202. In various embodiments, internal storage volumes 1202 are adapted to house large volumes of LNG in a first state and accommodate large volumes of water or various other liquids in a second state. In one embodiment, one or more drop-in liners 1204 are provided after LNG is emptied from portions 1202 of a vessel 1200, the liner(s) being adapted to receive volumes of water or liquid. The liner(s) prevent or mitigate the risk of cross-contamination between the water and previously stored LNG. In various embodiments, portions 1202 of a LNG tanker are segregated by barriers 1206. Barriers 1206 allow for separation of various liquid cargoes. Accordingly, in various embodiments, tankers of the present invention may comprise or transport various combinations of liquid cargoes based on user preference. As one of skill in the art will recognize, an entire shipment of LNG need not be offloaded in order to transport different cargo. For example, two of four compartments comprising LNG may be offloaded at a particular port, the emptied two compartments re-filled with a volume of water, and the vessel may be conveyed to an additional port carrying a combination of LNG and water (or similar). Accordingly, in various embodiments, a dynamic shipping method is provided which may comprise different quantities and types of liquids based on shipping routes, economic conditions, and various other factors.

In one embodiment, internal surfaces 1208 of portions 1202 may be coated with various materials to prevent or minimize risk of cross-contamination. For example, various spray-coatings may be applied once a quantity of LNG is emptied from a portion 1202 of the vessel to create a virgin surface for the holding and contacting with water or similar fluid cargoes. By way of example, industrial water-proof coatings provided by the Procachem Corporation may be provided to coat, cover, or seal a surface that was exposed to or in contact with LNG so as to render the surface capable of accommodating water without significant risk of cross-contamination.

In one embodiment, one or more tank cleaning apparatus are employed to cleanse the inside of a container or tank that housed LNG. For example, various features as shown and described in U.S. Patent Application Publication No. 2009/0308412 to Dixon, which is incorporated by reference herein, may be employed to prepare various LNG shipping tankers and containers for the transport of cargo other than LNG.

One of skill in the art will recognize that various methods and devices of the present invention are not limited to LNG shipping tanks or tankers. Indeed, various methods, features, and systems as described herein may be utilized with a variety of shipping containers and vessels, including, but not limited to, war-ships, recreational vessels, cargo-ships, etc.

The foregoing discussion of the invention has been presented for purposes of illustration and description. Further the description is not intended to limit the invention to the form disclosed herein. Consequently, variations and modifications commensurate with the above teachings, within the skill or knowledge of the relevant art, are within the scope of the present invention. The embodiments described above are further intended to explain the best mode presently known of practicing the invention and to enable others skilled in the art to utilize the invention in other embodiments and with various modifications required by their particular application or use of the invention. It is intended that the appended claims be construed to include alternative embodiments to the extent permitted by the prior art. It will be recognized that the steps described herein may be conducted in a variety of sequences without violating the novelty or spirit of the present invention. In one particular embodiment, the present invention is conducted by adhering to a sequence of first selecting a water source substantially free of harmful contaminants, including heavy metals, PCBs, and pesticides, subsequently constructing one or more filters at a point of lower gravitational potential energy than the source, subsequently identifying signature characteristics of the filtered water, and finally packaging the water for distribution.

What is claimed is:

1. A method of shipping water comprising:
a first location;
a second location; and
a shipping vessel, wherein:
said first location comprises substantial quantities of natural gas;
said second location comprises substantial quantities of water;
said shipping vessel is provided with cargo comprising natural gas at said first location and transported to said second location;
said shipping vessel is at least partially emptied of said cargo comprising natural gas and modified such that said vessel is adapted for transporting water as its cargo without subjecting the water to natural gas, said step of modifying including providing a flexible bag to contain said water;
providing said vessel with cargo comprising water at said second location;

wherein said shipping vessel is transported from said second location to said first location;

wherein said step of providing said shipping vessel with cargo comprising water includes the transfer of water from a bladder containing fresh water, said bladder comprising a hollow, flexible bag;

wherein said water is obtained from a melted glacial ice source, wherein the glacial ice is cut, drilled and/or divided into various segments to obtain said water; and wherein said water is filtered at said second location.

2. The method of claim 1, wherein the modified shipping vessel includes one or more bladders adapted for containing fresh, potable water by entirely encompassing the water in a flexible bag that isolates said water; and the water is sequestered in a form suitable for long term storage that does not affect the unique characteristics of the water.

3. A method of shipping water comprising:

providing a shipping vessel, wherein said shipping vessel comprises one or more shipping containers;

providing said one or more shipping containers on said shipping vessel with a first cargo at a first location, said first location including facilities adapted to convey at least one of oil and natural gas, said first cargo comprising said at least one of oil and natural gas;

transporting said shipping vessel to a second location, said second location having a source of at least one of fresh water and ice;

emptying said one or more shipping containers of said first cargo;

modifying said shipping vessel such that said shipping vessel is adapted for transporting as its primary cargo at least one of fresh water and ice without contacting said at least one of fresh water and ice with natural gas, said at least one of fresh water and ice being enclosed within a hollow, flexible bag;

providing said one or more shipping containers on said shipping vessel with a second cargo at said second location, wherein said second cargo comprises said at least one of fresh water and ice;

transporting said shipping vessel from said second location to said first location;

wherein the step of providing said shipping containers with said second cargo comprises transferring water from a hollow, flexible bladder containing fresh water;

wherein said second cargo includes at least water obtained from a glacial melt water source, wherein the glacial ice water source is cut, drilled and/or divided into various segments to obtain said water, and wherein said shipping containers include photovoltaic arrays adapted for converting solar energy into forms of energy which may be used by said shipping vessel.

4. The method of claim 3, wherein said shipping container comprises at least one of a tank, a hull, a compartment, and a bladder.

5. The method of claim 3, wherein modifying said shipping vessel comprises providing one or more bladders within a portion of said shipping vessel that previously contained said at least one of oil and natural gas.

6. The method of claim 3, wherein the modified shipping vessel includes one or more bladders adapted for containing said at least one of fresh water and ice.

7. The method of claim 3, further comprising providing a towable vessel selected from the group consisting of a flexible barge, a non-rigid barge, a bladder, a series of flexible fabric barges connected together in a string, and a non-rigid, water-impermeable device with an elongate shape.

8. The method of claim 7, wherein said towable vessel comprises photovoltaic arrays adapted for converting solar energy into forms of energy which may be used throughout at least one of said shipping vessel and said towable vessel; and wherein filtering said water after said transporting step.

9. The method of claim 3, wherein modifying said shipping vessel comprises providing one or more bladders within said one or more shipping containers.

10. The method of claim 3, further comprising filtering said fresh water after said transporting step.

11. The method of claim 10, wherein said filtering comprises filtration upon exit of said fresh water from said shipping container.

12. The method of claim 3, further comprising emptying said shipping containers of said second cargo.

13. The method of claim 12, wherein said emptying of said shipping containers of said second cargo is at said first location.

14. The method of claim 3, further comprising transporting said shipping vessel to a third location and emptying said shipping containers of said first cargo at said third location before transporting said shipping vessel to said second location.

15. A method of shipping water comprising:

providing a shipping vessel, wherein said shipping vessel comprises one or more shipping containers;

providing said one or more shipping containers on said shipping vessel with a first cargo at a first location, said first location including facilities adapted to convey at least one of oil and natural gas, said first cargo comprising said at least one of oil and natural gas;

transporting said shipping vessel to a second location, said second location having a source of at least one of fresh water and ice;

emptying said one or more shipping containers of said first cargo;

modifying said shipping vessel such that said shipping vessel is adapted for transporting as its primary cargo at least one of fresh water and ice without contacting said at least one of fresh water and ice with natural gas, said at least one of fresh water and ice being enclosed within a hollow, flexible bag;

providing said one or more shipping containers on said shipping vessel with a second cargo at said second location, wherein said second cargo comprises said at least one of fresh water and ice;

transporting said shipping vessel from said second location to said first location;

wherein the step of providing said shipping containers with said second cargo comprises transferring water from a hollow, flexible bladder containing fresh water;

wherein said second cargo includes at least water obtained from a glacial melt water source, wherein the glacial ice water source is cut, drilled and/or divided into various segments to obtain said water, and wherein said shipping containers include a source of one of a wind energy, wave energy and thermal energy that is adapted to convert one of wind, wave and thermal energy into a form of energy which may be used by said shipping vessel.

16. The method of claim 15, wherein said shipping container comprises at least one of a tank, a hull, a compartment, and a bladder.

17. The method of claim 15, wherein modifying said shipping vessel comprises providing one or more bladders within a portion of said shipping vessel that previously contained said at least one of oil and natural gas.

18. The method of claim 15, wherein the modified shipping vessel includes one or more bladders adapted for containing said at least one of fresh water and ice.

19. The method of claim 15, further comprising providing a towable vessel selected from the group consisting of a flexible barge, a non-rigid barge, a bladder, a series of flexible fabric barges connected together in a string, and a non-rigid, water-impermeable device with an elongate shape.

20. The method of claim 19, wherein said towable vessel comprises solar energy arrays adapted for converting solar energy into forms of energy which may be used throughout at least one of said shipping vessel and said towable vessel; and wherein filtering said water after said transporting step.

* * * * *